United States Patent
Jo et al.

(10) Patent No.: US 11,259,294 B2
(45) Date of Patent: Feb. 22, 2022

(54) METHOD AND DEVICE FOR RECEIVING SIGNAL IN WIRELESS COMMUNICATION SYSTEM

(71) Applicant: LG ELECTRONICS INC., Seoul (KR)

(72) Inventors: Soonki Jo, Seoul (KR); Yunjung Yi, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/969,962

(22) PCT Filed: Feb. 25, 2019

(86) PCT No.: PCT/KR2019/002278
§ 371 (c)(1),
(2) Date: Aug. 13, 2020

(87) PCT Pub. No.: WO2019/164366
PCT Pub. Date: Aug. 29, 2019

(65) Prior Publication Data
US 2020/0413377 A1    Dec. 31, 2020

Related U.S. Application Data

(60) Provisional application No. 62/634,696, filed on Feb. 23, 2018.

(51) Int. Cl.
*H04W 4/00*    (2018.01)
*H04W 72/04*    (2009.01)
*H04L 25/02*    (2006.01)

(52) U.S. Cl.
CPC ....... *H04W 72/042* (2013.01); *H04L 25/0238* (2013.01)

(58) Field of Classification Search
None
See application file for complete search history.

(56) References Cited

U.S. PATENT DOCUMENTS 11,051,287 B2 *   6/2021   McBeath ............ H04W 72/042
2009/0088148 A1 *   4/2009   Chung .................. H04W 48/16
                                                  455/423

(Continued)

OTHER PUBLICATIONS

LG Electronics, "Discussion on hierarchical search space structure," 3GPP TSG-RAN WG1 #90, R1-1713167, Aug. 2017, 12 pages.

(Continued)

*Primary Examiner* — Clemence S Han
(74) *Attorney, Agent, or Firm* — Lee Hong Degerman Kang & Waimey

(57) ABSTRACT

A method and a device allowing a terminal to receive a signal in a wireless communication system, according to one embodiment of the present invention, configure a search space set constructed in a hierarchical structure, and can monitor control channel candidates in the configured search space set. Particularly, when the hierarchical structure is constructed, a control channel candidate of a lower aggregation level (AL) in the search space set is randomly arranged on the basis of a control channel candidate of a top AL in the search space set, wherein a portion or the entire area of the control channel candidate of the lower AL can be arranged so as to overlap the control channel candidate of the top AL.

13 Claims, 19 Drawing Sheets

(56) References Cited

U.S. PATENT DOCUMENTS

| | | | |
|---|---|---|---|
| 2011/0110316 A1* | 5/2011 | Chen | H04W 72/042 |
| | | | 370/329 |
| 2012/0063401 A1* | 3/2012 | Xue | H04L 5/0037 |
| | | | 370/329 |
| 2013/0107819 A1* | 5/2013 | Noh | H04W 76/27 |
| | | | 370/329 |
| 2013/0142142 A1* | 6/2013 | McBeath | H04W 72/042 |
| | | | 370/329 |
| 2017/0086220 A1 | 3/2017 | Kim et al. | |
| 2018/0205522 A1* | 7/2018 | Wang | H04L 5/0053 |
| 2018/0279210 A1* | 9/2018 | Sun | H04L 5/0053 |
| 2019/0082422 A1* | 3/2019 | Sun | H04L 5/008 |
| 2020/0007295 A1* | 1/2020 | Kwak | H04L 5/0053 |
| 2020/0213983 A1* | 7/2020 | Zhang | H04W 72/042 |
| 2020/0396725 A1* | 12/2020 | Ji | H04W 72/044 |

OTHER PUBLICATIONS

LG Electronics, "Discussion on search space design," 3GPP TSG-RAN WG1 #90bis, R1-1717952, Oct. 2017, 13 pages.

Nokia, Nokia Shanghai Bell, "On NR operation under PDCCH channel estimation and BD limits," 3GPP TSG-RAN WG1 #92, R1-1802537, Mar. 2018, 13 pages.

Catt, "PDCCH search space design," 3GPP TSG-RAN WG1 #NR3, R1-1715813, Sep. 2017, 12 pages.

PCT International Application No. PCT/KR2019/002278, Written Opinion of the International Searching Authority dated Jun. 3, 2019, 20 pages.

* cited by examiner

[FIG. 1]
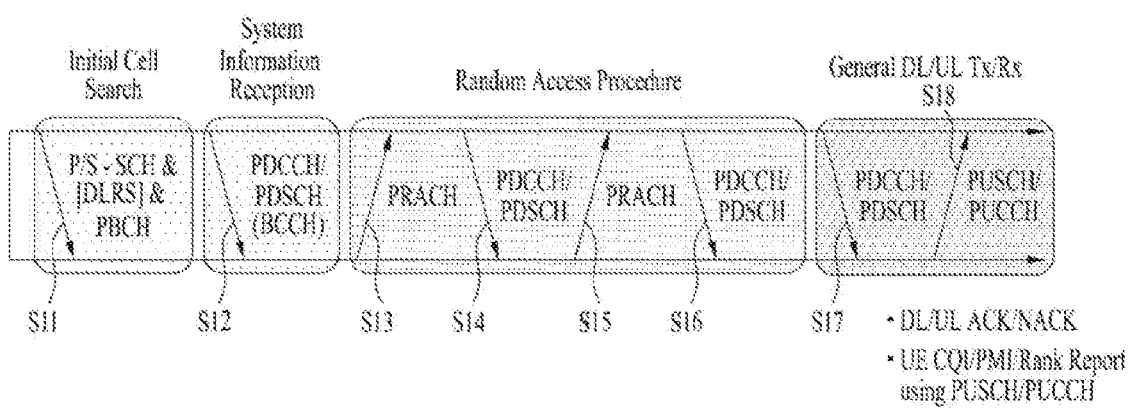

[FIG. 2]
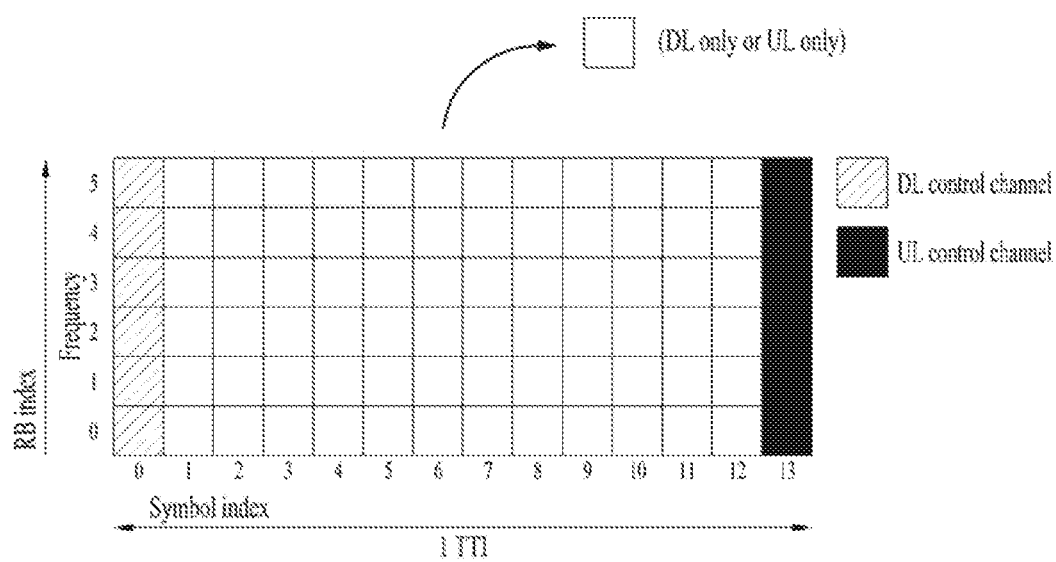

[FIG. 3]
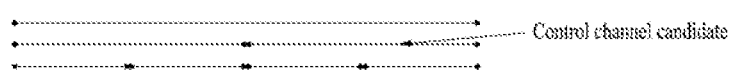
(a) Hierarchical structure of aggregation levels
(b) random structure of aggregation levels 【FIG. 4】
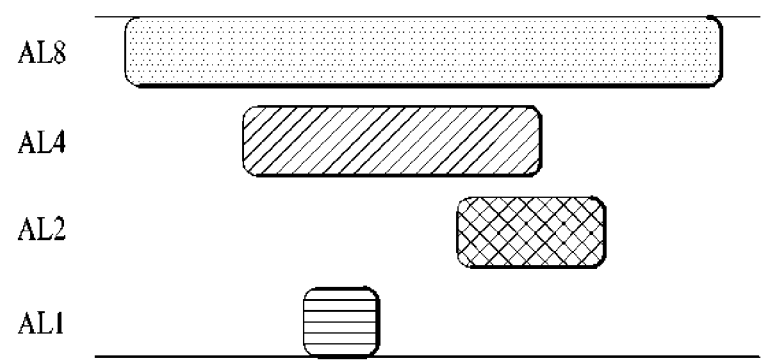
【FIG. 5】
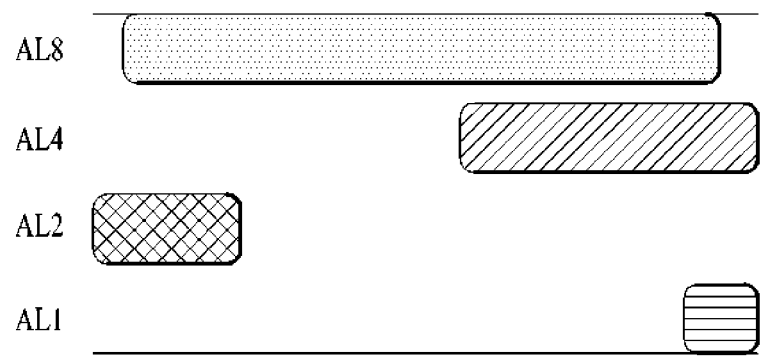

【FIG. 6】
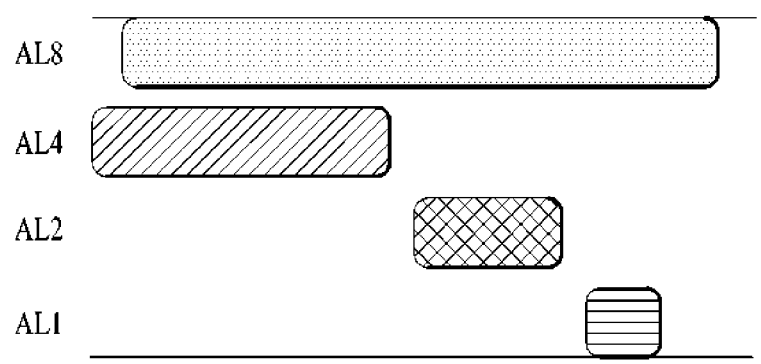

[FIG. 7]
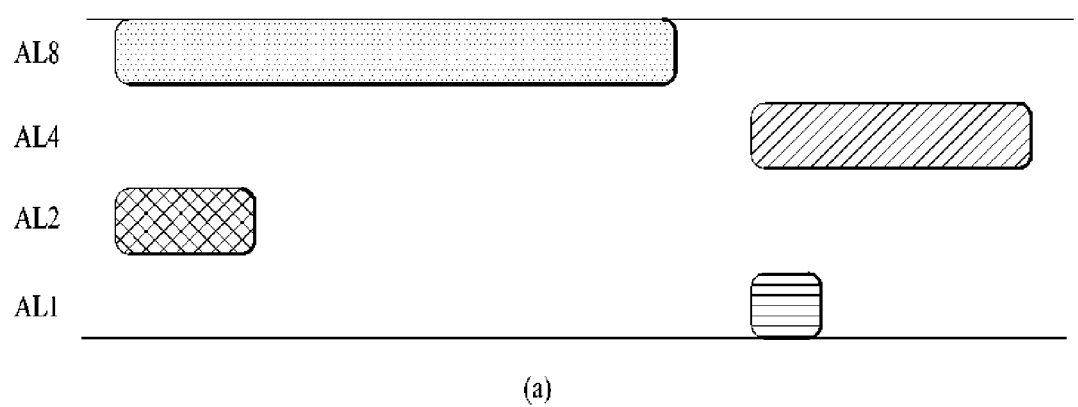
(a)
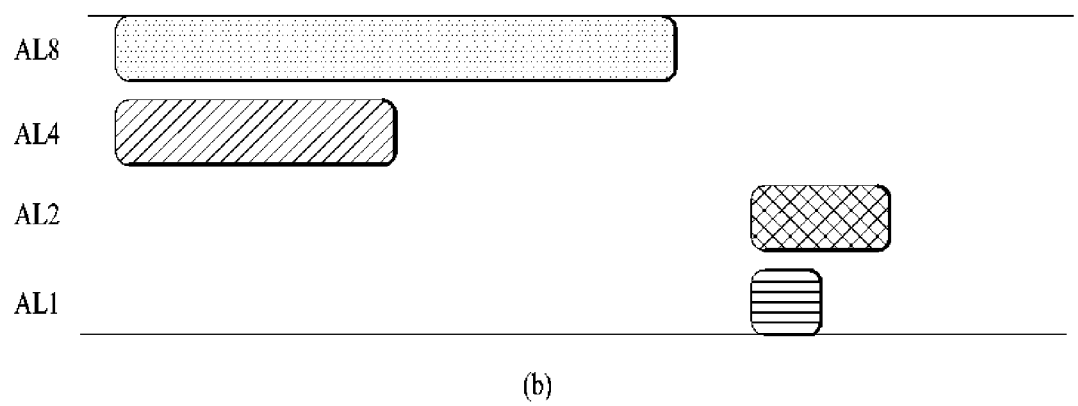
(b)

【FIG. 8】
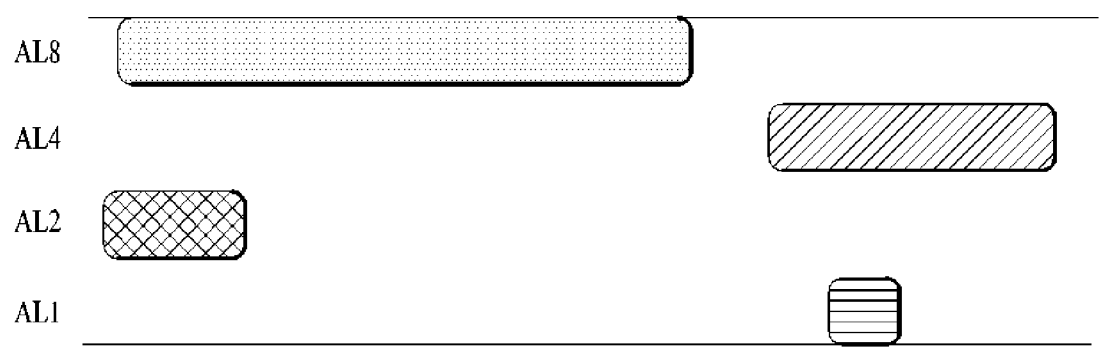
【FIG. 9】
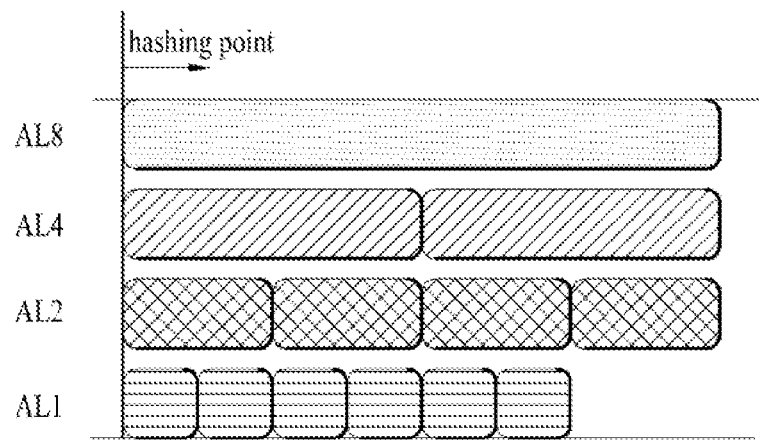

【FIG. 10】
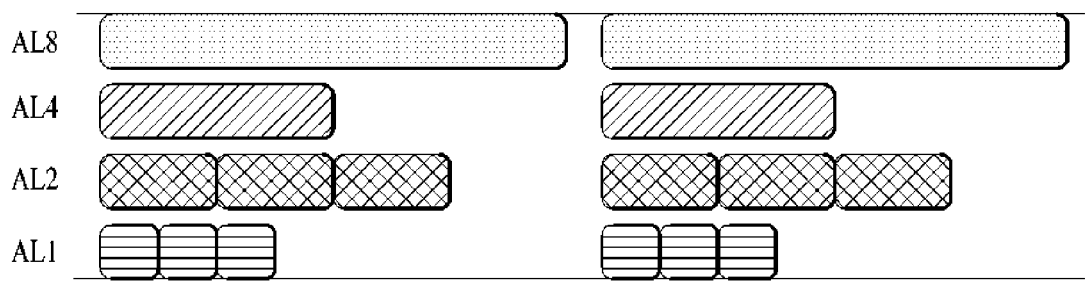
(a)
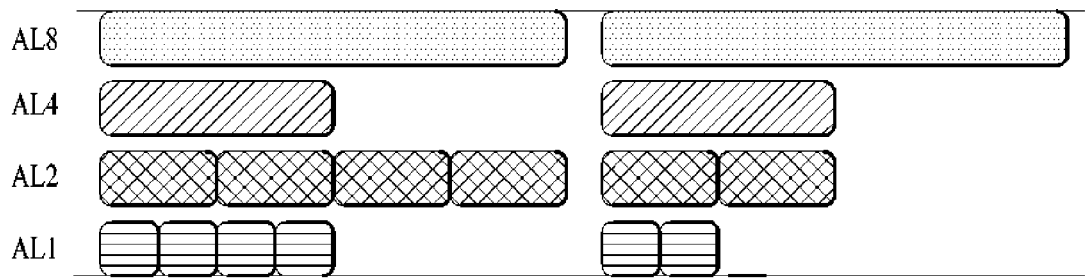
(b)
【FIG. 11】
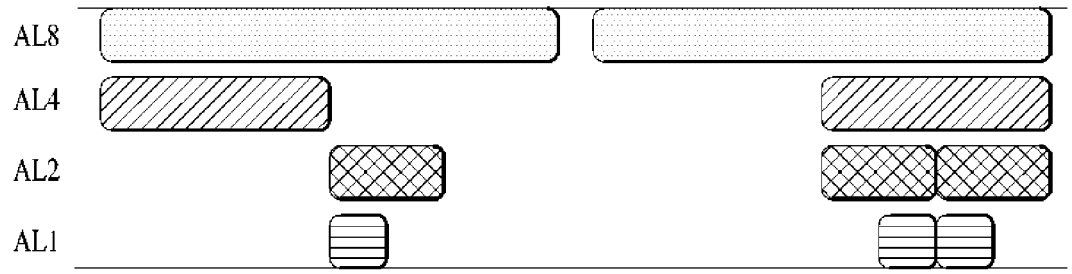
(a)　　　　　　　　　　　　(b)

【FIG. 12】
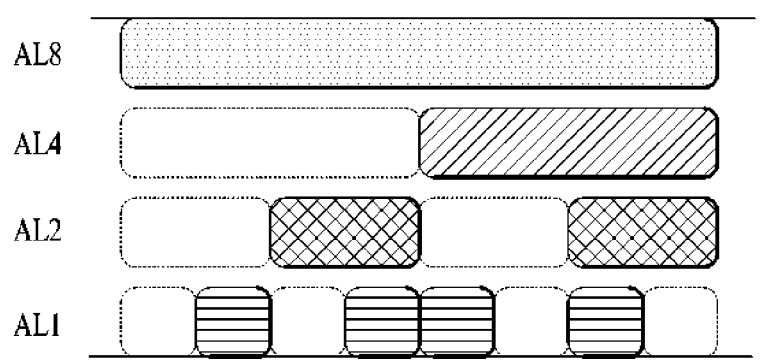
【FIG. 13】
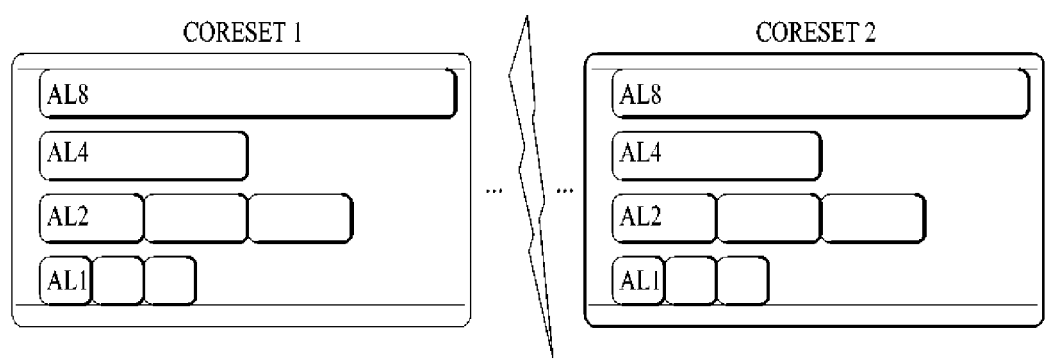

[FIG. 14]
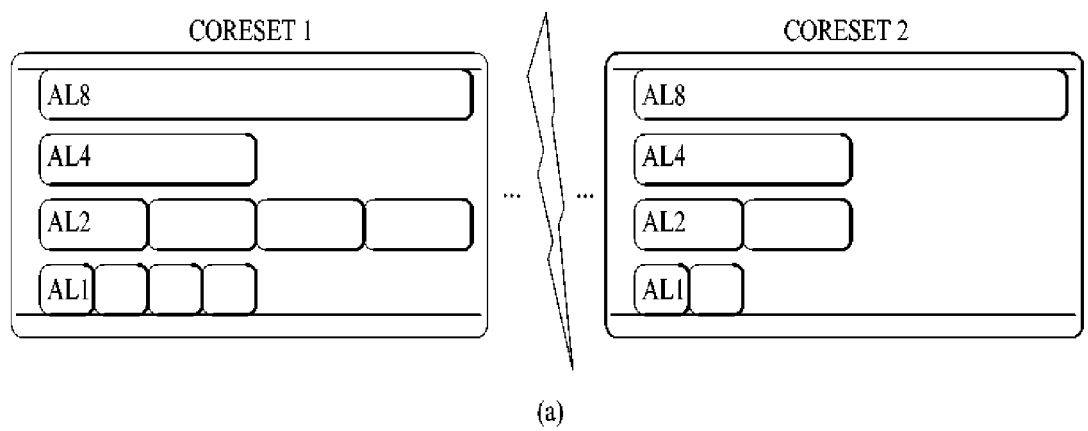
(a)
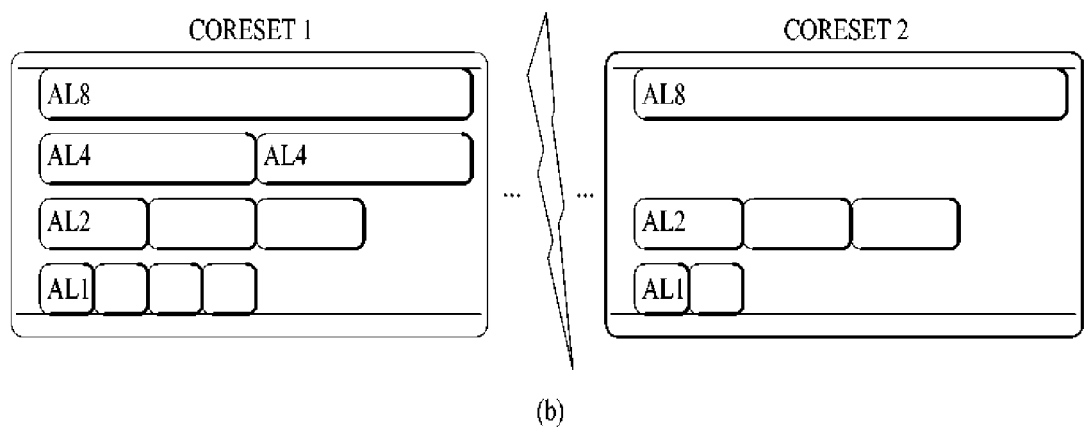
(b)

[FIG. 15]
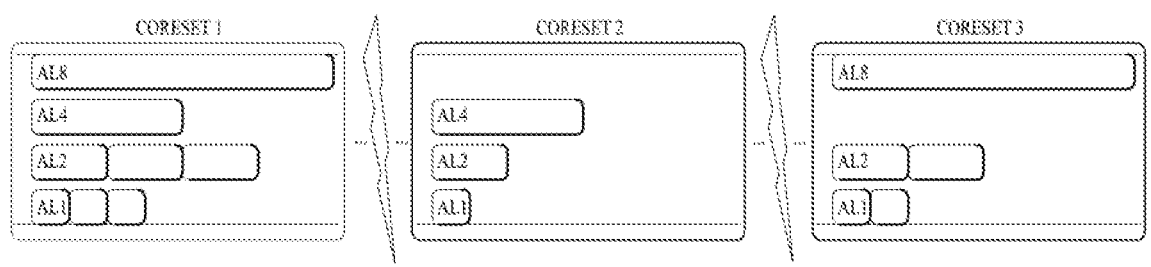

[FIG. 16]
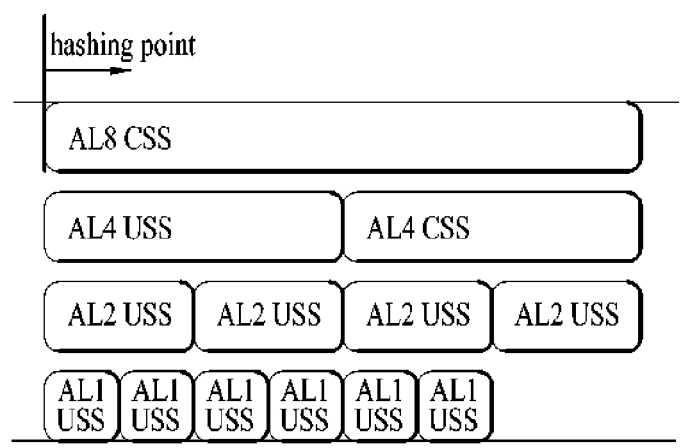

【FIG. 17】
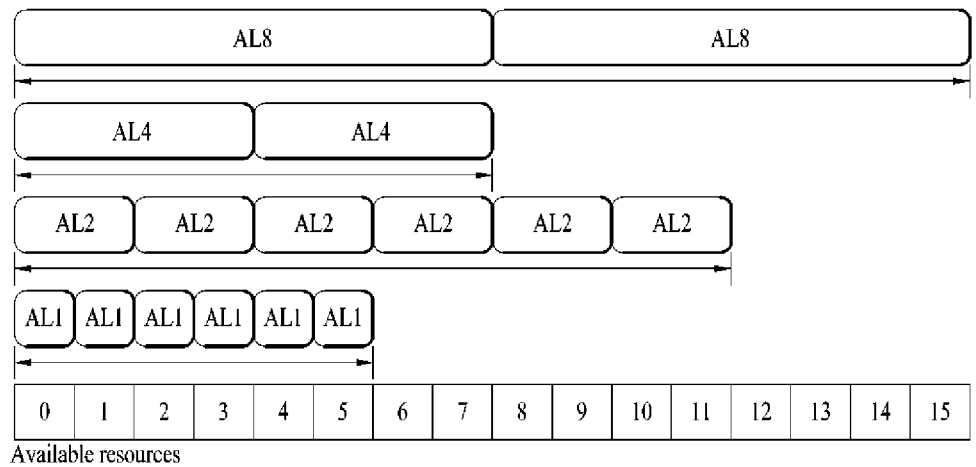
(a)
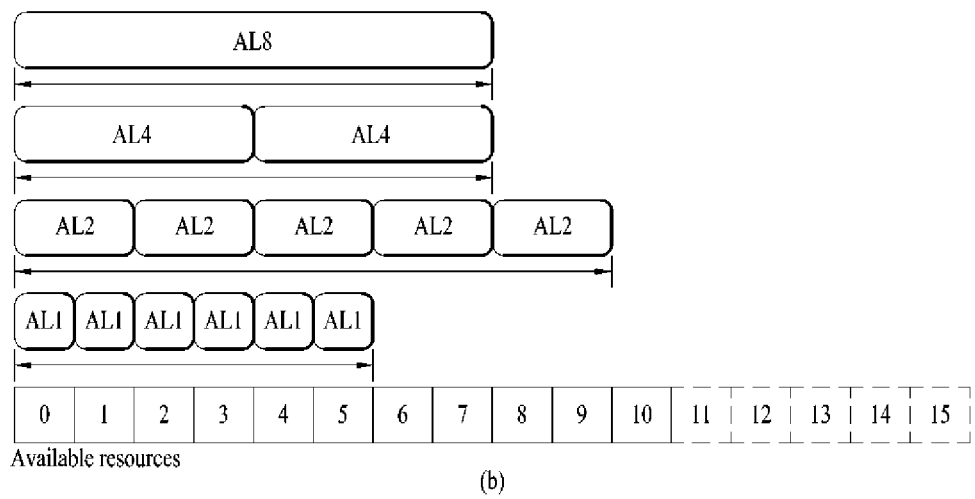
(b)
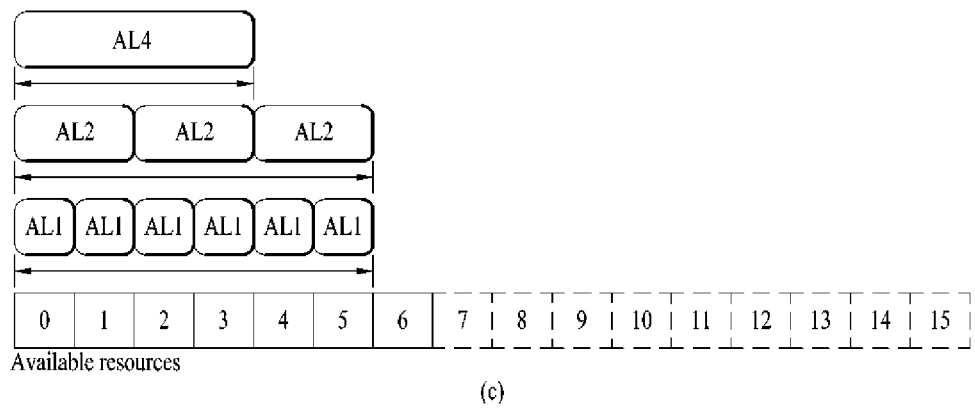
(c)

[FIG. 18A]
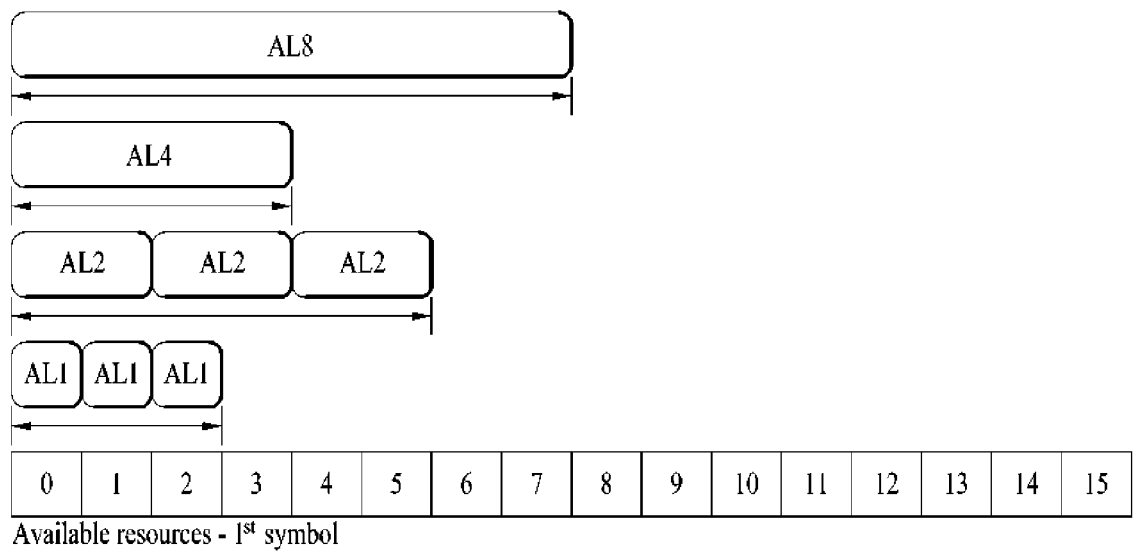
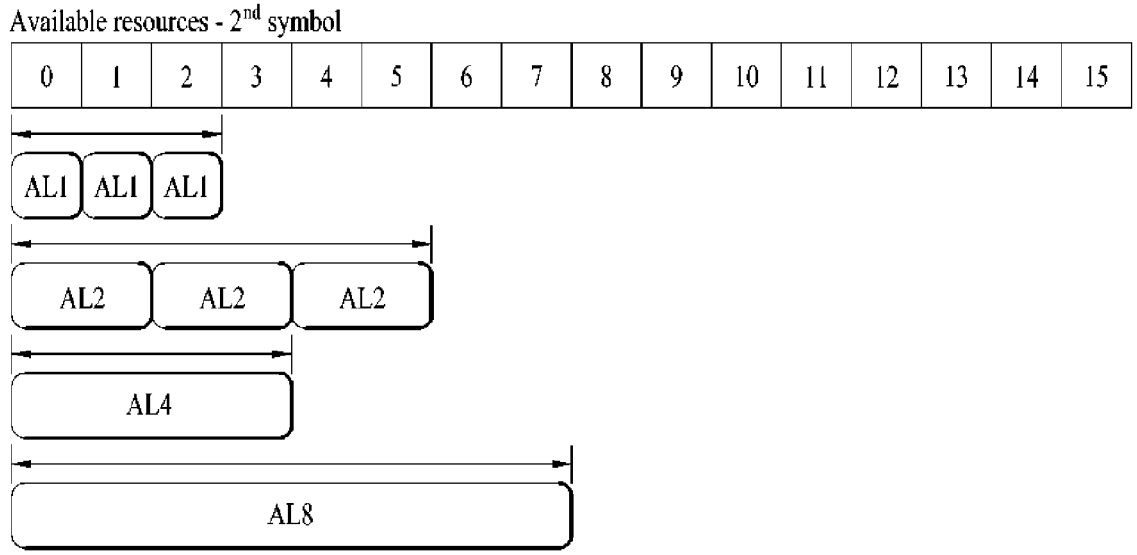

【FIG. 18B】
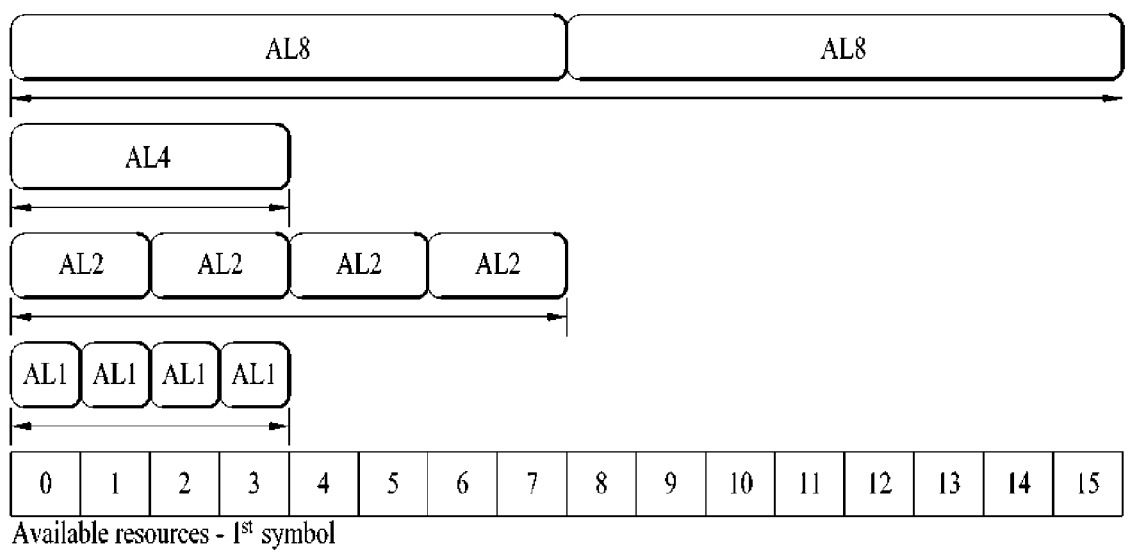
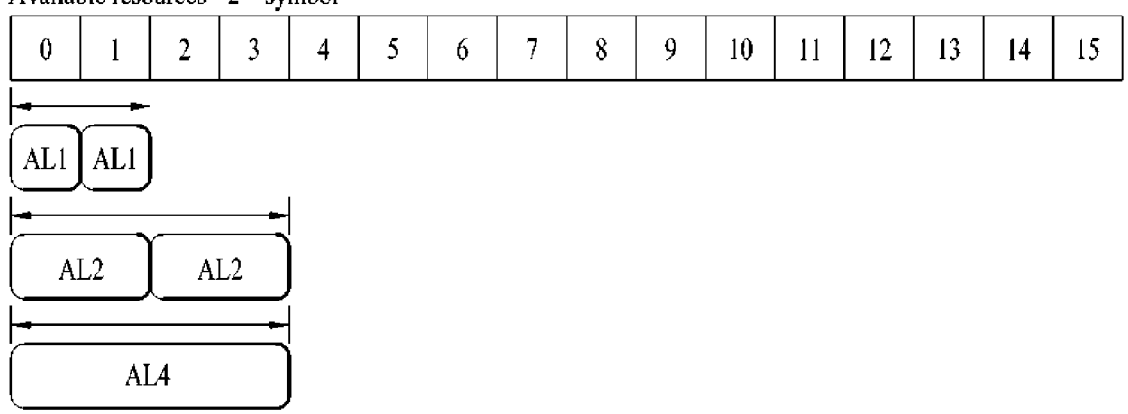

[FIG. 18C]
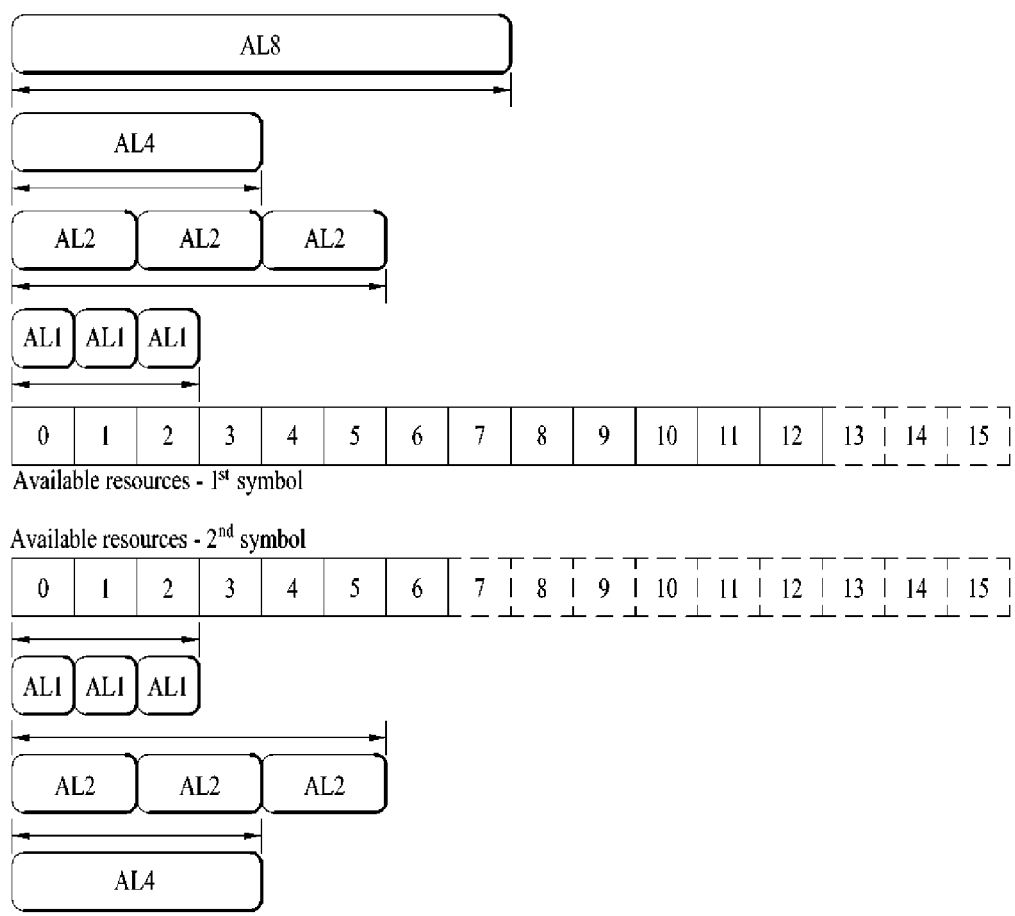

[FIG. 18D]
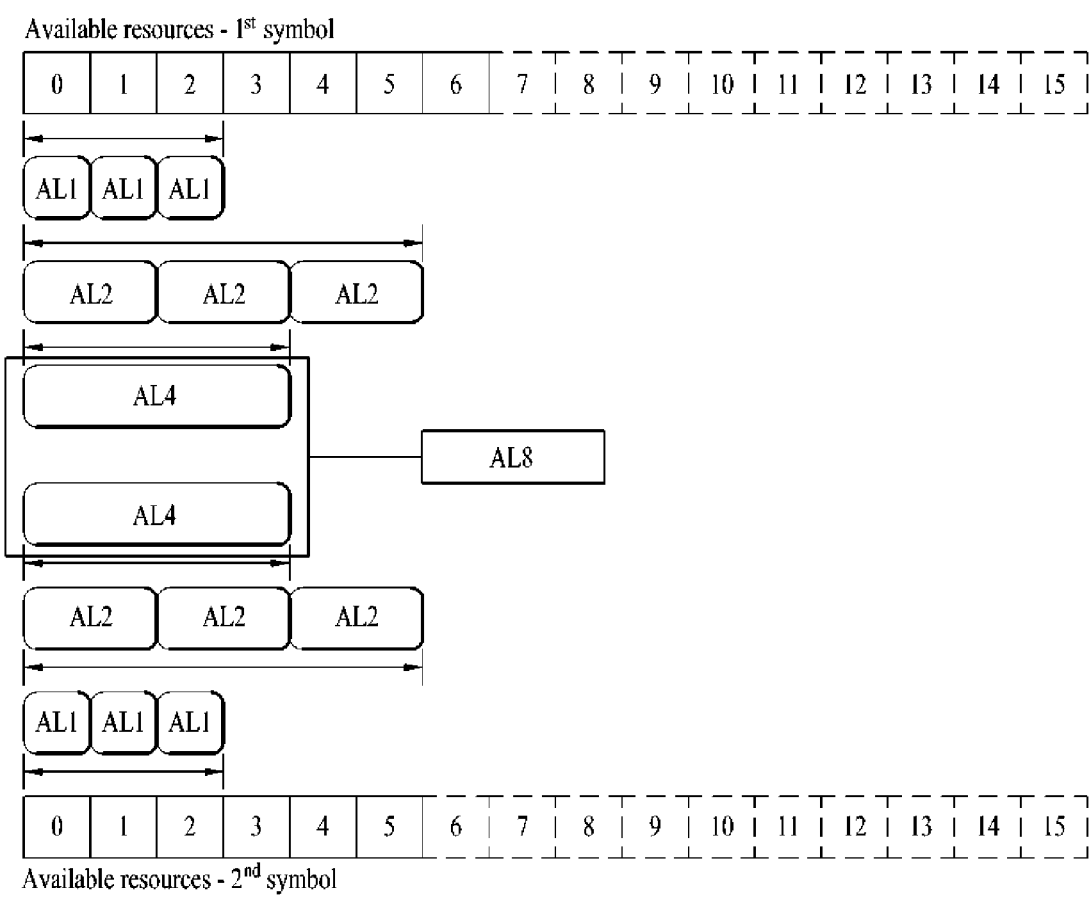

【FIG. 19】
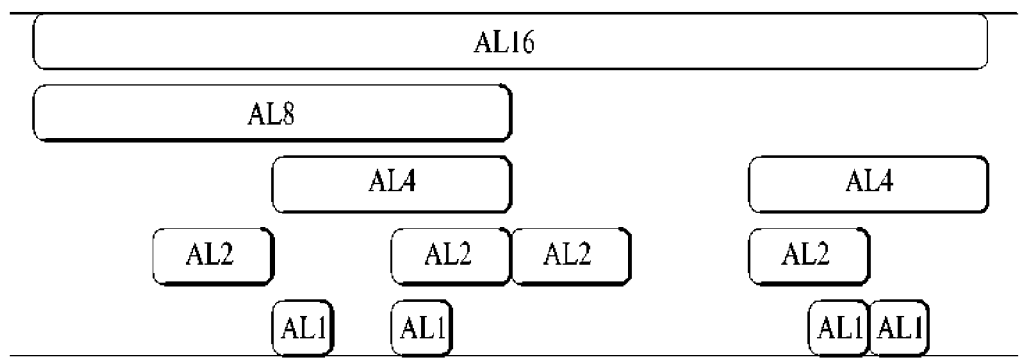
【FIG. 20】
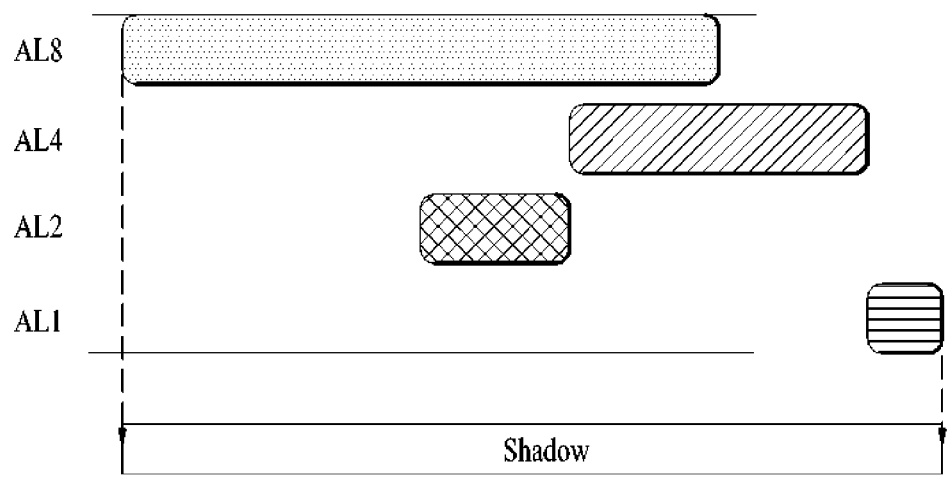

【FIG. 21】
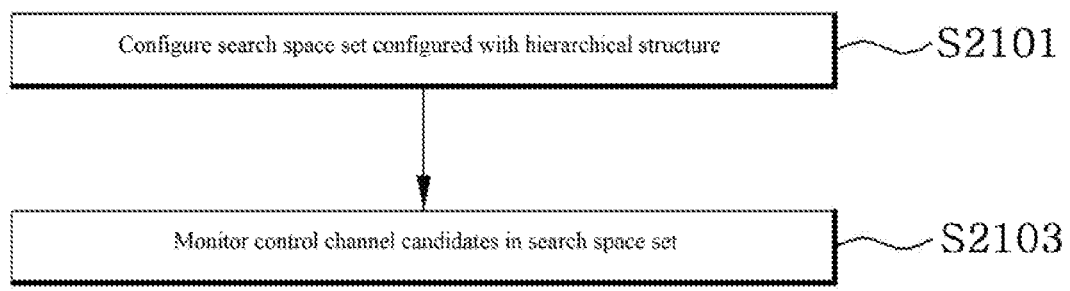
【FIG. 22】
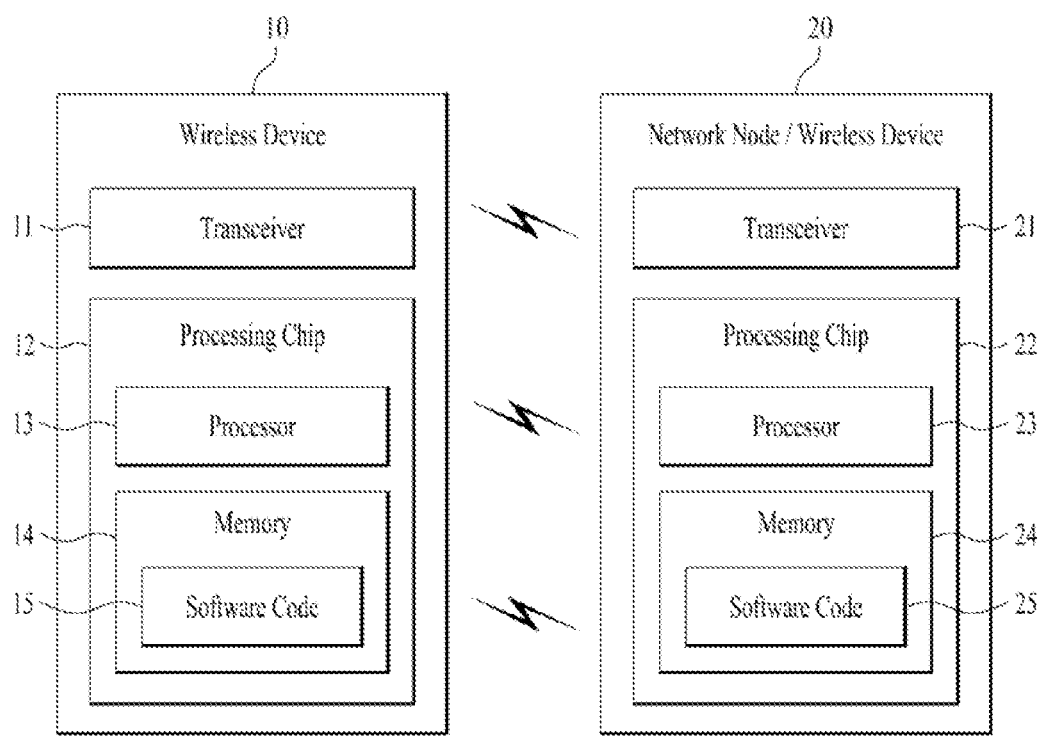

METHOD AND DEVICE FOR RECEIVING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2019/002278, filed on Feb. 25, 2019, which claims the benefit of U.S. Provisional Application No. 62/634,696, filed on Feb. 23, 2018, the contents of which are all hereby incorporated by reference herein in their entirety.

TECHNICAL FIELD

The present disclosure relates to a wireless communication system, and more particularly, to a method of receiving a signal and device therefor. Specifically, the present disclosure is directed to a method and device for receiving a control signal.

BACKGROUND ART

First, the existing 3GPP LTE/LTE-A system will be briefly described. Referring to FIG. 1, a user equipment (UE) performs an initial cell search (S101). In the initial cell search process, the UE receives a primary synchronization channel (P-SCH) and a secondary synchronization channel (S-SCH) from a base station (BS), performs downlink synchronization with the BS, and acquires information such as a cell ID. Thereafter, the UE acquires system information (e.g., MIB) through a physical broadcast channel (PBCH). The UE may check the state of a downlink channel by receiving a downlink reference signal (DL RS).

After the initial cell search, the UE may acquire more detailed system information (e.g., SIBs) by receiving a physical downlink control channel (PDCCH) and a physical downlink control channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through a PDCCH and a PDSCH corresponding to the PDCCH. In the case of a contention-based random access, a contention resolution procedure such as additional PRACH transmission (S105) and PDCCH/PDSCH reception (S106) may be performed.

Then, the UE may perform PDCCH/PDSCH reception (S107) and physical uplink shared channel (PUSCH)/physical uplink control channel (PUCCH) transmission (S108) as a general uplink/downlink signal transmission procedure. The UE may transmit uplink control information (UCI) to the BS. The UCI may include a hybrid automatic repeat request acknowledgment/negative-acknowledgment (HARQ ACK/NACK), a scheduling request (SR), a channel quality indicator (CQI), a precoding matrix indicator (PMI), and/or a rank indicator (RI).

DISCLOSURE

Technical Task

The technical task of the present disclosure is to provide a method of receiving a signal in a user equipment and apparatus therefore, by which control channel candidates in a search space set can be efficiently monitored in a wireless communication system.

It is to be understood that both the foregoing general description and the following detailed description of the present disclosure are exemplary and explanatory and are intended to provide further explanation of the disclosure as claimed.

Technical Solutions

The present disclosure provides a signal reception method in a wireless communication system and device therefor.

In one technical aspect of the present disclosure, provided herein is a method of receiving a signal by a user equipment in a wireless communication system, the method including configuring a search space set configured in a hierarchical structure and monitoring control channel candidates within the configured search space set, wherein when the hierarchical structure is configured, a control channel candidate of a lower Aggregation Level (AL) within the search space set is randomly arranged with reference to a control channel candidate of a highest AL within the search space set in a manner that a partial or whole region of the control channel candidate of the lower AL overlaps with the control channel candidate of the highest AL.

In another technical aspect of the present disclosure, provided herein is a user equipment receiving a signal in a wireless communication system, the user equipment including a transceiver and a processor controlling the transceiver, wherein the processor is configured to configure a search space set configured in a hierarchical structure and control the transceiver to monitor control channel candidates within the configured search space set and wherein when the hierarchical structure is configured, a control channel candidate of a lower Aggregation Level (AL) within the search space set is randomly arranged with reference to a control channel candidate of a highest AL within the search space set in a manner that a partial or whole region of the control channel candidate of the lower AL overlaps with the control channel candidate of the highest AL.

Regarding the method or user equipment, a hashing point of the control channel candidate of the lower AL may be configured based on a reference hashing point and a point parameter, the reference hashing point may be a hashing point of the control channel candidate of the highest AL, and the point parameter may be a value to give a difference between the reference hashing point and the hashing point of the control channel candidate of the lower AL.

Regarding the method or user equipment, when a value of the pointer parameter is denoted by $\gamma$, the hashing point of the control channel candidate of the lower AL may be determined as a sum of the reference hashing point and the $\gamma$. The $\gamma$ may satisfy $-L_l < \gamma < L_h$. The $L_l$ may be the number of Control Channel Elements (CCEs) for arranging the control channel candidate of the lower AL thereon. And, the $L_h$ may be the number of CCEs for arranging the control channel candidate of the highest AL thereon.

Regarding the method or user equipment, the user equipment may reuse a channel estimation result performed for blind decoding of the control channel candidate of the highest AL for a partial or whole region of the control channel candidate of the lower AL overlapping with the control channel candidate of the highest AL.

Regarding the method or user equipment, the control channel candidate of the highest AL may be a virtual control channel candidate not configured as a control channel candidate for control information transmission within a Control Resource Set (CORESET) including the search space set.

Here, the user equipment may receive information indicating that the control channel candidate of the highest AL is the virtual control channel candidate through a higher layer signal.

Alternatively, a channel estimation complexity limit value for limiting the number of CCEs blind-decodable by the user equipment may be configured and the user equipment may set the number of the virtual control channel candidates based on the channel estimation complexity limit value.

Regarding the method or user equipment, further included are configuring a plurality of search space sets for different DCIs and monitoring a plurality of control channel candidates for each of a plurality of the search space sets for the different DCIs. And, all control channel candidates within the search space sets may be included in a hierarchical structure.

Here, a priority may be configured for each of a plurality of the search space sets. A channel estimation complexity limit value for limiting the number of CCEs blind-decodable by the user equipment may be configured. And, when the hierarchical structure is configured, the control channel candidates may be sequentially arranged by starting with a control channel candidate of a highest AL within a search space set of a high priority within a range not exceeding the limit value.

It will be understood by those skilled in the art that the above-described aspects of the present disclosure are merely part of the embodiments of the present disclosure and various modifications and alternatives could be developed from the following technical features of the present disclosure.

Advantageous Effects

According to one embodiment of the present disclosure, when a user equipment monitors control channel candidates in a search space, it is advantageous in monitoring the control channel candidates more efficiently through a new hierarchical structure configuration.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 illustrates physical channels used in a 3GPP LTE/LTE-A system and a general signal transmission method using the physical channels.

FIG. 2 is a diagram illustrating a self-contained subframe structure applicable to the present disclosure.

FIG. 3 is a diagram showing a hierarch structure of aggregation levels.

FIGS. 4 to 20 are diagrams showing examples of control channel candidate arrangements according to embodiments of the present disclosure.

FIG. 21 is a conceptual diagram of a signal receiving method according to embodiments of the present disclosure.

FIG. 22 is a block diagram showing an apparatus for embodying embodiment(s) of the present disclosure.

BEST MODE FOR DISCLOSURE

The following description of examples of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present disclosure may be non-limited. Specific terminologies used in the following description are provided to help understand the present disclosure and the use of the terminologies can be modified to a different form within a scope of the technical idea of the present disclosure.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

1. NR Frame Structure and Physical Resource

In a new RAT (NR) system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include Nsymbsubframe,$\mu$=Nsymbslot× Nslotsubframe,$\mu$ contiguous OFDM symbols. Nsymbslot represents the number of symbols per slot, $\mu$ represents OFDM numerology, and Nslotsubframe,$\mu$ represents the number of slots per subframe with respect to corresponding $\mu$. In NR, multiple OFDM numerologies shown in Table 1 below may be supported.

TABLE 1

| μ | Δf = $2^μ · 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1 above, Δf refers to subcarrier spacing (SCS). μ and cyclic prefix with respect to a DL carrier bandwidth part (BWP) and μ and cyclic prefix with respect to a UL carrier BWP may be configured for a UE via UL signaling.

Table 2 below shows the number of Nsymbslot of symbols per slot, the number Nslotframe,μ of symbols per frame, and the number Nslotsubframe,μ of slots per subframe with respect to each SCS in the case of normal CP.

TABLE 2

| μ | $N_{symb}^{slot}$ | $N_{slot}^{frame, μ}$ | $N_{slot}^{subframe, μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below shows the number Nsymbslot of symbols per slot, the number Nslotframe,μ of slots per frame, and the number Nslotsubframe,μ of slots per subframe with respect to each SCS in the ca se of extended CP.

TABLE 3

| μ | $N_{symb}^{slot}$ | $N_{slot}^{frame, μ}$ | $N_{slot}^{subframe, μ}$ |
|---|---|---|---|
| 2 | 12 | 40 | 4 |

As such, in an NR system, the number of slots included in 1 subframe may be changed according to subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a configured of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

FIG. 2 is a diagram illustrating a self-contained subframe structure applicable to the present disclosure.

In FIG. 2, the hatched area (e.g., symbol index=0) represents a DL control region, and the black area (e.g., symbol index=13) represents a UL control region. The other area (e.g., symbol index=1 to 12) may be used for DL or UL data transmission.

Based on the self-contained slot structure, a BS and a UE may sequentially perform DL transmission and UL transmission in one slot. That is, the BS and the UE may transmit and receive not only DL data but also UL ACK/NACK for the DL data in one slot. The self-contained slot structure may reduce a time required for data retransmission when a data transmission error occurs, thereby minimizing the latency of the final data transmission.

In the self-contained slot structure, a time gap with a predetermined length is required to allow the BS and the UE to switch from transmission mode to reception mode or vice versa. To this end, some OFDM symbols at the time of switching from DL to UL may set as a guard period (GP).

Although it is described that the self-contained slot structure includes both the DL and UL control regions, these control regions may be selectively included in the self-contained slot structure. In other words, the self-contained slot structure according to the present disclosure may include either the DL control region or the UL control region as well as both the DL and UL control regions as shown in FIG. 7.

For example, a slot may have various slot formats. In this case, OFDM symbols in each slot can be classified into a DL symbol (denoted by 'D'), a flexible symbol (denoted by 'X'), and a UL symbol (denoted by 'U').

Thus, a UE may assume that DL transmission occurs only in symbols denoted by 'D' and 'X' in a DL slot. Similarly, the UE may assume that UL transmission occurs only in symbols denoted by 'U' and 'X' in a UL slot.

2. NR DL Control Channel

In an NR system, a transmissions NR system, a transmission unit of a control channel may be defined as a resource element group (REG) and/or a control channel element (CCE), etc. The CCE may refer to a minimum unit for control channel transmission. That is, a minimum PDCCH size may correspond to 1 CCE. When an aggregation level is equal to or greater than 2, a network may group a plurality of CCEs to transmit one PDCCH (i.e., CCE aggregation).

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

An eNB may signal information regarding a CORESET to a UE. For example, a CORESET configuration for each CORESET may be signaled to the UE, and the CORESET configuration may be signaled in time duration (e.g., 1/2/3 symbol) of the corresponding CORESET, a frequency domain resource of the corresponding CORESET, precoder granularity, an REG-to-CCE mapping type (e.g., interleaved/non-Interleaved), a REG bundling size and an interleaver size in the case of an interleaved REG-to-CCE mapping type, and so on.

When REG-to-CCE mapping with respect to 1-symbol CORESET is a non-interleaved type, 6 REGs with respect to a CCE are grouped to one REG bundle and all REGs of the corresponding CCE may be contiguous. When a plurality of CCEs is present in 1 PDCCH (e.g., when an aggregation level is equal to or greater than 2), CCEs may also be contiguous. A UE may assume the same precoding in 1 REG bundle or may assume the same precoding with respect to a plurality of REG bundles.

When REG-to-CCE mapping with respect to 1-symbol CORESET is an interleaved type, 2, 3, or 6 REGs may configure 1 REG bundle. For example, all REG bundle sizes of 2, 3, and 6 are not supported but, as a subset thereof, for example, an REG bundle size of {2}, {3}, {2,3}, {2,6}, {3,6}, or {2,3,6} may be supported. When an REG bundle size of {2, 6} is supported, 2 REGs may configure 1 REG bundle or 6 REGs may configure 1 REG bundle. A UE may assume the same precoding in 1 REG bundle or may assume the same precoding with respect to a plurality of REGs according to precoder granularity.

In the case of REG-to-CCE mapping with respect to a CORESET having duration of 2 symbols or greater, a REG bundle may be defined in time/frequency domain. When an REG bundle is defined in the time domain, all REGs belonging to 1 REG bundle may belong to the same RB and may correspond to different symbols. When an REG bundle is defined in the time-frequency domain, 1 REG bundle may include REGs belonging to different RBs as well as REGs that belong to the same RB and correspond to different symbols.

Time-first mapping may be supported for REG-to-CCE mapping with respect to a CORESET having duration of 2 symbols or greater. An REG bundle may be supported to be configured on the time domain in the same way as time domain duration of a CORESET. In the case of non-interleaved type, 6 REGs included in a CCE may correspond to 1 REG bundle and REGs of the corresponding CCE may be localized in the time/frequency domain. In the case of an interleaved type, 2, 3, or 6 REGs may correspond to 1 REG bundle and REG bundles may be bundled in a CORESET.

A UE may assume the same precoding in 1 REG bundle or may assume the same precoding with respect to a plurality of REGs according to precoder granularity.

3.1 Processing Load of UE

As described above, CCE refers to a resource unit for transmitting a control channel. Aggregation Level (AL) is defined as the number of CCEs included in a group configured with contiguous CCEs. In the conventional communication system, ALs are defined as four types such as 1, 2, 4 and 8. In a new communication system related to the present disclosure, ALs may be defined as 16 types or more.

As described above, a Search Space (SS) may be a set of control channel candidates on which a UE performs blind detection. A prescribed number of CCEs according to AL may be included in a search space. A resource size of a search space may be in a state fixed by the configuration of a UE or Base Station (BS).

When a resource size of a search space is in a fixed state, a length of a single CCE varies depending on AL. If a different PDCCH per CCE is included in a search space, the number of control channel candidates that can exist in the search space may vary depending on AL. Here, the control channel candidate is a resource region in which CCE can exist, and a set of control channel candidates configure a search space.

A UE may obtain DCI information by receiving PDCCH from a BS. The BS does not inform the UE of an accurate location of a control channel candidate for the UE to receive PDCCH. The UE may be aware of a location of a search space in which the PDCCH may be possibly received. For the monitoring of PDCCH, blind decoding is performed in a search space. When a plurality of UEs exist, each of a plurality of the UEs has a separate search space for itself. Resource regions in which per-UE search spaces are located may overlap with each other.

When a UE performs blind decoding on control channel candidates, it performs channel estimation per control channel candidate. Namely, if the number of control channel candidates that will be blind-decoded by a UE is increased, channel estimation targets of the UE are increased as well. The UE's channel estimation target increase has correlation with a processing load of the UE.

3.2 The Problem of the Hierarchical Structure

A UE performs blind decoding to search for PDCCH. Before the UE performs the blind decoding, a channel estimation process is necessary. As a means for reducing an amount of channel estimation, a hierarchical structure is designed. FIG. 3 shows one example of a hierarchical structure. Referring to FIG. 3, control channel candidates per AL are configured in one symbol with the same hashing point, whereby control channel candidates per AL are arranged in the same time and frequency resource regions in one symbol in a manner of overlapping with each other. For example, when one control channel candidate of AL=8 is allocated to a predetermined frequency region in one symbol, two control channel candidates of AL=4 are allocated to the same frequency region in the same symbol with the same hashing point.

In a hierarchical structure, since every hashing point of a per-AL control channel candidate is the same, channel estimation information of a per-AL CCE may be shared and there is an effect that a channel estimation operation amount of a UE is reduced. Since the per-AL control channel candidate has the same hashing point, a bundle of control channel candidates exist at one hashing point.

However, according to the hierarchical structure, a blocking problem may be caused. By a hashing function, each of a plurality of UEs has a hashing point for a control channel candidate to perform blind decoding thereon. Hashing points for each UE may overlap with each other. When a plurality of UEs perform blind decoding on control channel candidates included in a hierarchical structure type, if one of the control channel candidates is allocated to one UE, all the rest of the control channel candidates included in the hierarchical structure type cannot be allocated to other UEs. Such a problem is called blocking.

Hereinafter, detailed embodiments for blocking avoidance are suggested.

4. The Candidate Allocation with the Higher AL Candidate 4.1 the Candidate Allocation in the Space of the Higher AL's Candidate In a control channel candidate bundle including a plurality of control channel candidates, a length and hashing point of a control channel candidate of a highest AL among control channel candidates per AL will be defined as $L_h$ and $HP_h$, respectively.

Firstly, a hashing point for a control channel candidate of a highest AL may be determined. Assuming that a length of a control channel candidate of a lower AL is referred to as $L_l$, $L_l$ has a length smaller than that of $L_h$. The entire time and frequency resource regions in which a control channel candidate of a lower AL is arranged may match the time and frequency resource regions in which a control channel candidate of a higher level is arranged already. Hereinafter, if control channel candidates are arranged in a manner that the entire time and frequency resource regions in which the control channel candidate of the lower AL is arranged match the time and frequency resource regions in which the control channel candidate of the higher level is arranged, it may be expressed as randomly arranging the control channel candidate of the lower AL within the control channel candidate of the higher AL. Or, a control channel candidate of a lower AL is arranged so as not to deviate from a resource region in which a control channel candidate of a higher level exists. Or, it may be expressed as the entire resource region of a control channel candidate of a lower AL is arranged in a manner of overlapping with a control channel candidate of a higher AL. In such a structure, a result of channel estimation performed on a control channel candidate of a specific AL by a UE may be reused for a control channel candidate of another AL.

Assuming that a hashing point of a control channel candidate of a lower AL is $HP_l$, the $HP_l$ may be defined as Equation 1.

$$HP_l = HP_h + \alpha \quad \text{[Equation 1]}$$

$\alpha$ is a point parameter that enables a control channel candidate of a lower AL to be randomly arranged within a control channel candidate of a higher AL, and may be defined as Equation 2.

$$0 \leq \alpha \leq \Delta L, (\Delta L = L_h - L_l) \quad \text{[Equation 2]}$$

A BS may define α while knowing $HP_h$, $L_l$, and $\Delta L$. A UE may receive specific information such as an identity number, an identity index, etc. Or, specific information may be already defined in the UE. The UE may calculate α using the specific information.

An example is described with reference to FIG. 4. FIG. 4 shows a case that a length of a highest AL is 8 CCEs. A hashing point of a control channel candidate of AL=8 is referred to as $HP_{hst}$. According to the above-described method, α is defined per AL, whereby a control channel candidate of AL=4, a control channel candidate of AL=2, and a control channel candidate of AL=1 can be randomly arranged within a control channel candidate of AL=8. Regarding AL=4, a range of α may become $0 \leq \alpha \leq 4$. Regarding AL=2, a range of α may become $0 \leq \alpha \leq 6$. Regarding AL=1, a range of α may become $0 \leq \alpha \leq 7$.

In a hierarchical structure, a hashing point $HP_{hst}$ of a control channel candidate of a highest AL becomes a hashing point of a control channel candidate of a lower AL. Yet, according to the present embodiment, as α varies per AL, all per-AL control channel candidates have different hashing points, respectively. Since the per-AL control channel candidates have different hashing points, blocking occurrence can be prevented. In addition, if hashing points of a control channel candidate of a lower AL satisfy Equation 1, control channel candidates of the lower AL exist within a control channel candidate of a highest AL. A UE uses a result of channel estimation of a control channel candidate of a specific AL for a control channel candidate of another AL, thereby reducing the processing load.

With reference to an AL lower than a highest AL instead of the highest AL, a control channel candidate may be arranged by the same method.

In the present embodiment and other embodiments described in the present disclosure, as shown in Table 4, a search space and PDCCH format defined in the legacy LTE and LTE-A systems may be used. Alternatively, a search space and PDCCH format defined in the NR (5G) system may be available.

TABLE 4

| PUCCH format | Number of CCEs (Aggregation level) (n) | Space size in terms of CCE | | Number of candidates In common search space | Number of candidates In UE-specific search space |
|---|---|---|---|---|---|
| | | Common | UE-specific | | |
| 0 | 1 | — | 6 | — | 6/1 = 6 |
| 1 | 2 | — | 12 | — | 12/2 = 6 |
| 2 | 4 | 16 | 8 | 16/4 = 4 | 8/4 = 2 |
| 3 | 8 | 16 | 16 | 16/2 = 2 | 16/8 = 2 |

4.2. The Candidate Allocation Near the Space of the Higher AL's Candidate

Only portions of the time and frequency resource regions in which a control channel candidate of a lower AL is arranged may match the time and frequency resource regions in which a control channel candidate of a higher AL is already arranged. For example, as shown in FIG. 5, a portion of a single control channel candidate of a lower AL is located outside a control channel candidate of a higher AL but a portion of the single control channel candidate of the lower AL may be randomly arranged so as to be located within the control channel candidate of the higher AL. Hereinafter, if control channel candidates are arranged in a manner that only portions of the time and frequency resource regions in which a control channel candidate of a lower AL is arranged are arranged to match the time and frequency resource regions in which a control channel candidate of a higher AL, it may be expressed as a control channel candidate of a lower AL is arranged across a boundary part of a control channel candidate of a higher AL.

Unlike the case that a control channel candidate of a lower AL is arranged within a control channel candidate of a higher AL, a UE may reuse a once-executed channel estimation result for a part of a control channel candidate of a lower AL, which is arranged within a control channel candidate of a higher AL, and perform additional channel estimation on a part of a control channel candidate of a lower AL, which is arranged outside the control channel candidate of the higher AL.

Assuming that a hashing point of a control channel candidate of a lower AL is $HP_l$, the $HP_l$ may be defined as Equation 3.

$$HP_l = HP_h + \beta \quad \text{[Equation 3]}$$

β is a point parameter that enables a control channel candidate of a lower AL to be randomly arranged within a predetermined range from a control channel candidate of a higher AL, and may be defined as Equation 4.

$$-L_l < \beta \leq 0 \text{ and } \Delta L \leq \beta < L_h, (\Delta L = L_h - L_l) \quad \text{[Equation 4]}$$

A BS may define β while knowing $HP_h$, $L_l$, and $\Delta L$. A UE may receive specific information such as an identity number, an identity index, etc. Or, specific information may be already defined in the UE. The UE may calculate β using the specific information.

An example is described with reference to FIG. 5. FIG. 5 shows a case that a length of a highest AL is 8 CCEs. Assuming that a hashing point of a control channel candidate of AL=8 is $HP_{hst}$, β is defined per AL, whereby a control channel candidate of AL=4, a control channel candidate of AL=2, and a control channel candidate of AL=1 can be randomly arranged across a boundary of a control channel candidate of AL=8. Regarding AL=4, a range of β may become −4<β≤0 and 0≤β<4. Regarding AL=2, a range of β may become −2<β≤0 and 6≤β<8. Regarding AL=1, a range of β may become −1<β≤0 and 7≤β<8.

According to the present embodiment, as β varies per AL, all per-AL control channel candidates have different hashing points other than $HP_{hst}$, respectively. Since the per-AL control channel candidates have different hashing points, blocking occurrence can be prevented. In addition, if hashing points of a control channel candidate of a lower AL satisfy Equation 3, control channel candidates of the lower AL are arranged across the boundary part of a control channel candidate of a highest AL like FIG. 5. A UE uses a result of channel estimation of a control channel candidate of a specific AL for a control channel candidate of another AL, thereby reducing the processing load.

With reference to an AL lower than a highest AL instead of the highest AL, a control channel candidate may be arranged by the same method.

4.3. The Candidate Allocation in or Near the Space of the Higher AL's Candidate

As shown in FIG. 6, A control channel candidate of a lower AL may be randomly arranged within a control channel candidate of a higher AL or across a boundary part of the control channel candidate of the higher AL.

If a control channel candidate of a lower AL exists within a control channel candidate of a higher AL, a UE may intactly apply a result of channel estimation performed on the higher AL to the control channel candidate of the lower AL. if a control channel candidate of a lower AL exists across a boundary part of a control channel candidate of a higher AL, a UE may reuse a result of once-executed channel estimation for a part of the control channel candidate of the lower AL, which is arranged within the control channel candidate of the higher AL, and perform additional channel estimation on a part of the control channel candidate of the lower AL, which is arranged outside the control channel candidate of the higher AL.

Assuming that a hashing point of a control channel candidate of a lower AL is $HP_l$, the $HP_l$ may be defined as Equation 5.

$$HP_l = HP_h + \gamma \quad \text{[Equation 5]}$$

γ is a point parameter that enables a control channel candidate of a lower AL to be randomly arranged within a predetermined range from a control channel candidate of a higher AL, and may be defined as Equation 6.

$$-L_l < \gamma < L_h, (\Delta L = L_h - L_l) \quad \text{[Equation 6]}$$

A BS may define γ while knowing $HP_h$, $L_l$, and $\Delta L$. A UE may receive specific information such as an identity number, an identity index, etc. Or, specific information may be already defined in the UE. The UE may calculate γ using the specific information.

An example is described with reference to FIG. 6. FIG. 6 shows a case that a length of a highest AL is 8 CCEs. Assuming that a hashing point of a control channel candidate of AL=8 is $HP_{hst}$, γ is defined per AL, whereby a control channel candidate of AL=4, a control channel candidate of AL=2, and a control channel candidate of AL=1 can be randomly arranged within a control channel candidate of AL=8 or across a boundary of the control channel candidate of AL=8. Regarding AL=4, a range of γ may become −4<γ<8. Regarding AL=2, a range of γ may become −2<γ<8. Regarding AL=1, a range of γ may become −1<γ<8.

According to the present embodiment, as γ varies per AL, all per-AL control channel candidates have different hashing points other than $HP_{hst}$, respectively. Since the per-AL control channel candidates have different hashing points, blocking occurrence can be prevented. In addition, if hashing points of a control channel candidate of a lower AL satisfy Equation 5, control channel candidates of the lower AL are arranged within a control channel candidate of the higher AL or across the boundary part of the control channel candidate of the higher AL like FIG. 6. A UE uses a result of channel estimation of a control channel candidate of a specific AL for a control channel candidate of another AL, thereby reducing the processing load.

With reference to an AL lower than a highest AL instead of the highest AL, a control channel candidate may be arranged by the same method.

5. Building the Semi-Hierarchical Structure 5.1. The Semi-Hierarchical Structure Grouping As shown in FIG. 7, within a control channel candidate including a plurality of control channel candidates, control channel candidates of some ALs may configure a set. When a hierarchical structure includes control channel candidates of all ALs, a structure that includes control channel candidates of some ALs only may be referred to as a semi-hierarchical structure. According to a scheme of configuring ALs that will be included in a hierarchical structure or a scheme of configuring ALs that will be bundled as a semi-hierarchical structure, the number of semi-hierarchical structures included in a single hierarchical structure may be changed.

Control channel candidates of the respective ALs configuring a single semi-hierarchical structure may have the same hashing point through the same hashing function. n semi-hierarchical structures configure a semi-hierarchical structure set. Hashing points of control channel candidates of the respective ALs configuring a semi-hierarchical structure may be defined as $HP_{sh-1}$, $HP_{sh-2}$ . . . $HP_{sh-n}$.

When a parameter for changing a hashing point per control channel candidate of each AL exists in a hashing function, the corresponding parameter may be identically usable for control channel candidates of ALs configuring a single semi-hierarchical structure.

An example is described with reference to FIG. 7. FIG. 7 shows a case that a length of a control channel candidate of a highest AL is 8 CCEs. Lower ALs correspond to 4 CCEs, 2 CCEs, and 1 CCE, whereby ALs of total 4 steps are configured. Referring to FIG. 7 (a), control channel candidates of AL 1 and AL 4 are configured as one semi-hierarchical structure and control channel candidates of AL 2 and AL 8 are configured as another semi-hierarchical structure. Referring to FIG. 7 (b), control channel candidates of AL 1 and AL 2 are configured as one semi-hierarchical structure and control channel candidates of AL 4 and AL 8 are configured as another semi-hierarchical structure.

A hashing function in the legacy communication system is defined as Equation 7.

$$L\left\{(Y_k+m) \bmod \left\lfloor \frac{N_{CCE,k}}{L} \right\rfloor \right\}+i,$$ [Equation 7]

$$Y_{-1}=n_{RNTI} (\text{need at Subframe 0})$$

In Equation 7, L indicates AL of a control channel candidate. In the related art, since AL is individually set per control channel candidate, control channel candidates have different hashing points, respectively. According to the present embodiment, control channel candidates of the respective ALs configuring a single semi-hierarchical structure have the same value L. The control channel candidates of the respective ALs configuring the single semi-hierarchical structure are arranged based on the same hashing point.

Referring to FIG. 7 (a), control channel candidates of AL 1 and AL 4 are arranged based on the same hashing point and control channel candidates of AL 2 and AL 8 are arranged based on the same hashing point. Referring to FIG. 7 (b), control channel candidates of AL 1 and AL 2 are arranged based on the same hashing point and control channel candidates of AL 4 and AL 8 are arranged based on the same hashing point.

5.2. The Semi-Hierarchical Structure Grouping with Random Allocation of Lower AL As shown in FIG. 8, in configuring a semi-hierarchical structure, as described in Embodiment 4, a control channel candidate of a lower AL is randomly arranged in a control channel candidate of a higher AL or across a boundary part thereof, whereby randomness can be increased. A control channel candidate of a lower AL has a hashing point different from that of a control channel candidate of a higher AL. For the hashing point configuration of the control channel candidate of the lower AL, it may be necessary to introduce a point parameter.

A control channel candidate of a highest AL in a single semi-hierarchical structure is referred to as $HP_{sh-n}$. $HP_{sh-n}$ may be determined based on a conventional hashing function. Control channel candidates of a lower AL in a single semi-hierarchical structure may have a hashing point $HP_{sh-n}^{lower}$ based on Equation 8.

$$HP_{sh-n}^{lower}=HP_{sh-n}+\varepsilon$$ [Equation 8]

$\varepsilon$ is a point parameter that enables a control channel candidate of a lower AL to be randomly arranged within a predetermined range from a control channel candidate of a higher AL, and may be defined as Equation 9.

$$-L_l<\varepsilon<L_h, (\Delta L=L_h-L_l)$$ [Equation 9]

While knowing $HP_{sh-n}$, $L_l$, and $\Delta L$, a BS may define $\varepsilon$. A UE may receive specific information such as an identity number, an identity index, and the like. Or, specific information may be already defined in the UE. The UE may calculate $\varepsilon$ using the specific information.

An example is described with reference to FIG. 8. FIG. 8 shows a case that a length of a highest AL is 8 CCEs. Lower ALs include 4, 2 and 1, respectively, whereby total 4-step ALs are configured. As shown in FIG. 8, control channel candidates of AL 1 and AL 4 may configure a semi-hierarchical structure group 1 and control channel candidates of AL 2 and AL 8 may configure a semi-hierarchical structure group 2. A hashing point for a control channel candidate of a highest AL in the semi-hierarchical structure group 1 may be defined as $HP_{sh-1}$, and a hashing point for a control channel candidate of a highest AL in the semi-hierarchical structure group 2 may be defined as $HP_{sh-2}$.

A hashing point of a control channel candidate of AL=1 may be found based on Equation 10. A range of $\varepsilon_1$ may become $-L_l<\varepsilon_1<L_4$.

$$HP_{sh-n}^1=HP_{sh-1}+\varepsilon_1$$ [Equation 10]

A hashing point of a control channel candidate of AL=2 may be found based on Equation 11. A range of $\varepsilon_2$ may become $L_2<\varepsilon_2<L_8$.

$$HP_{sh-n}^2=HP_{sh-2}+\varepsilon_2$$ [Equation 11]

According to the present embodiment, even in a single semi-hierarchical structure, all per-AL control channel candidates have different hashing points due to $\varepsilon$. In addition, if a hashing point for a control channel candidate of a lower AL satisfies Equation 8 in a single semi-hierarchical structure, as shown in FIG. 8, the control channel candidate of the lower AL is arranged within a control channel candidate of a higher AL or across a boundary part thereof in the corresponding semi-hierarchical structure. Through this, blocking prevention and the reduction of UE's processing load can be achieved.

6. Search Space Allocation Mode 6.1. The Hierarchical Structure that all ALs have the Same Starting Point As shown in FIG. 9, when control channel candidates are arranged in a search space, a hierarchical structure may be configured in a manner that start points (i.e., hashing points) of all per-AL search space candidates are the same. A search space candidate of a specific AL means a set of control channel candidates configured as the specific AL. For example, in FIG. 9, a search space of AL=1 means a set of 6 control channel candidates of AL=1. And, a search space of AL=4 means a set of 2 control channel candidates of AL=4.

Start points of all per-AL search space candidates are set identical to each other by a hashing function for a search space candidate of a highest AL. The highest AL means a greatest AL among ALs used for configuration of a hierarchical structure. Within each of the per-AL search space candidates, a multitude of control channel candidates based on the same hashing point may be arranged contiguously.

An example is described with reference to FIG. 9. FIG. 9 shows a case that a length of a highest AL is 8 CCEs. Lower ALs include 4 CCEs, 2 CCEs and 1 CCE, whereby total 4-step ALs are configured. In the legacy LTE system, for USS, there may be 2 control channel candidates of AL=8, 2 control channel candidates of AL=4, 6 control channel candidates of AL=2, and 6 control channel candidates of AL=1. In the NR system, for CSS, there may be 1 control channel candidate of AL=16, 2 control channel candidates of AL=8, and 4 control channel candidates of AL=4. A control channel candidate including a hashing point within each of per-AL search spaces will be referred to as a reference control channel candidate. Hashing points of per-AL control channel candidates are all the same. Within a search space candidate of one AL, other control channel candidates are arranged in a manner of being adjacent to a reference control channel candidate. Regarding the advantage of the structure according to the present embodiment, since all per-AL search space candidates have the same hashing point, it is unnecessary to designate a hashing point that is identified per AL. In addition, a UE can easily reuse a channel estimation value obtained from a search space candidate of a specific AL for a search space candidate of another AL. hereinafter, the same hashing point owned by all search space candidates in a hierarchical structure may be referred to as 'hashing point of a hierarchical structure'.

6.2. The Multiple Hierarchical Structure Sets

When search space candidates of the respective ALs are arranged in a hierarchical structure, two or more control channel candidates may exist in a search space candidate of one AL. As shown in FIG. 10, control channel candidates in a search space candidate of one AL may belong to different hierarchical structures.

Although hashing points of per-AL search space candidates are identical to each other within a single hierarchical structure, at least one hashing function is necessary for the single hierarchical structure. When a plurality of hierarchical structures exist, hashing functions are necessary as many as the number of a plurality of the hierarchical structures at least. As shown in FIG. 10 (a), a plurality of the hierarchical structures may include the same number of per-AL control channel candidates. As shown I FIG. 10 (b), a plurality of the hierarchical structures may include a different number of per-AL control channel candidates.

Hierarchical structures may be arranged in a plurality of CORESETs in manner of being divided. Alternatively, a plurality of hierarchical structures may be arranged in a single CORESET.

When hierarchical structures are arranged in a plurality of CORESETs by being divided, one of a plurality of the CORESETS may include a single hierarchical structure. The hierarchical structures included in the different CORESETs respectively may have different hashing functions. In the present disclosure, 'a hashing function of a hierarchical structure' means a hashing function of a reference control channel candidate for configuring a hierarchical structure.

If a plurality of hierarchical structures are arranged in a single CORESET, the hierarchical structures have hashing functions of their own, respectively. Although a plurality of the hierarchical structures share a single hashing function with each other, a hashing point of another hierarchical structure may be determined by applying an offset value to a hashing point that is determined based on a hashing function of a specific hierarchical structure (e.g., a reference hierarchical structure).

An example is described with reference to FIG. 10. FIG. 10 shows a case that a length of a highest AL is 8 CCEs. Lower ALs include 4, 2 and 1, whereby total 4-step ALs are configured. Assuming that a search space is configured with 2 hierarchical structures, as shown in FIG. 10 (a), one of the 2 hierarchical structures is configured with 1 control channel candidate of AL=8, 1 control channel candidate of AL=4, 1 control channel candidate of AL=2, and 3 control channel candidates of AL=1, and the 2 control channel candidates may include the same control channel candidates. Alternatively, as shown in FIG. 10 (b), one hierarchical structure including 1 control channel candidate of AL=8, 1 control channel candidate of AL=4, 4 control channel candidates of AL=2, and 4 control channel candidates of AL=1 and one hierarchical structure including 1 control channel candidate of AL=8, 1 control channel candidate of AL=4, 2 control channel candidates of AL=2, and 2 control channel candidates of AL=1 may be configured.

6.3. The Hierarchical Structure that the Higher AL's Candidate is Piled on the Lower AL's Candidate When search space candidates of AL are arranged, a search space candidate of a lower AL is arranged first and a search space candidate of a higher AL may be then arranged in a manner of including the search space candidate of the lower AL. There may be various methods of arranging a search space candidate of a higher AL. When there are a plurality of search space candidates of a lower AL, search space candidates of all ALs may be included in a search space candidate of a higher AL.

A method of arranging search space candidates of ALs may be as follows. As shown in FIG. 11 (b), a search space candidate of a right-next higher AL may be arranged to include a search space candidate of a right-next lower AL. Alternatively, as shown in FIG. 11 (a), a search space candidate of a highest AL may be arranged to include a search space candidate of a lower AL in a manner that a search space candidate of a right-next higher AL may not include a search space candidate of a right-next lower AL necessarily.

An example is described with reference to FIG. 11. FIG. 11 shows a case that a length of a highest AL is 8 CCEs. Lower ALs include 4, 2 and 1, whereby total 4-step ALs are configured. After a search space candidate of AL=1 has been arranged, a search space candidate of AL=2, a search space candidate of AL=4, and a search space candidate of AL=8 may be arranged in order. As shown in FIG. 11 (a) or FIG. 11 (b), since a search space candidate of AL=1, a search space candidate of AL=2 and a search space candidate of AL=4 are included in a search space candidate of AL=8, a channel estimation result reusable by a UE is increased advantageously.

6.4. The Hierarchical Structure that the Search Spaces of ALs are Distributed Over CCEs of the Highest AL When search space candidates of AL are arranged, a plurality of candidate hashing points (or candidate starting points) may be configured within a search space candidate of a highest AL. Control channel candidates of lower ALs may be arranged by randomly selecting one of a plurality of the candidate hashing points.

A candidate hashing point may be configured based on a size of a control channel candidate of a lower AL, which will be arranged within a control channel candidate of a higher AL. OR, each CCE of a higher AL may become a reference for configuring candidate hashing points of control channel candidates of lower ALs.

Control channel candidates of one AL may be arranged individually or non-contiguously. Control channel candidates of different lower ALs may be arranged in a manner of overlapping with each other. When a candidate hashing point for a prescribed control channel candidate is randomly determined or each CCE of a higher AL is set as a candidate hashing point for a control channel candidate of a lower AL, a control channel candidate of the higher AL may include the control channel candidate of the lower AL. Before a control channel candidate of a lower AL is arranged, since a hashing point for arranging the control channel candidate of the lower AL in the control channel candidate of the higher AL should be determined, the control channel candidate of the higher AL may be arranged ahead of the control channel candidate of the lower AL.

An example is described with reference to FIG. 12. FIG. 12 shows a case that a length of a highest AL is 8 CCEs. Lower ALs include 4, 2 and 1, whereby total 4-step ALs are configured. As shown in FIG. 12, 2 hashing points for control channel candidates of AL=4 may be defined within one control channel candidate of AL=8.4 hashing points for control channel candidates of AL=2 may be defined. 8 hashing points for control channel candidates of AL=1. Based on the defined hashing points, per-A control channel candidates may be randomly arranged. According to the present embodiment, a UE is less likely to reuse a channel estimation result but possibility of blocking occurrence may be lowered.

6.5 The Hierarchical Structure that the any AL's Candidate Randomly Selects the Other AL's Candidate When a hierarchical structure is configured with search space candidates of a plurality of ALs, there may be two or more control channel candidates of one AL. The number of control channel candidates may differ for each of the ALs. When the number of control channel candidates differs per AL, it is necessary to determine which one of a plurality of control channel candidates of a first AL will overlap with which one of a plurality of control channel candidates of a second AL.

For example, each of the control channel candidates pf the first AL having the relatively large number of control channel candidates is arranged first based on a specific hash function. Each of the control channel candidates of the second AL having the relatively small number of control channel candidates is selected so as to overlap with a prescribed one of the control channel candidates of the first AL in consideration of a channel status or randomly.

7. Hierarchical Structure Across the CORESET 7.1 the Same Hierarchical Structures Across the CORESET A search space may be arranged in a manner of being distributed to a plurality of CORESETs. A per-CORESET search space may be configured as a hierarchical structure. Hierarchical structures configured for a plurality of CORESETs may have the same number of control channel candidates. Control channel candidates per AL are arranged in CORESETs, respectively in a manner of being divided by the number of the CORESETs, whereby all the numbers of the per-AL control channel candidates arranged for the CORESETs respectively become identical to each other.

An example is described with reference to FIG. 13. FIG. 10 shows a case that a length of a highest AL is 8 CCEs. Lower ALs include 4 CCEs, 2 CCEs and 1 CCE, whereby total 4-step ALs are configured. A specific UE is assumed as performing blind decoding on DCI in 2 CORESETs. As shown in FIG. 13, per-AL control channel candidates are arranged in CORESETs by being divided by the same number, respectively, whereby the arranged control channel candidates configure a hierarchical structure.

7.2. The Unbalanced Hierarchical Structures Across the CORESET-1

When a search space is arranged in a manner of being distributed to a plurality of CORESETs, types of the per-CORESET hierarchical structures may be different from each other. A hierarchical structure may be configured in a manner that at least one of control channel candidates of a highest AL is arranged in each of the CORESETs. At least one or more of control channel candidates of lower ALs may be arranged in the CORESETs, respectively, or may be arranged randomly without separate restrictions. The number of control channel candidates arranged in each CORESET may be identical or different for each CORESET.

An example is described with reference to FIG. 14. FIG. 14 shows a case that a length of a highest AL is 8 CCEs. Lower ALs include 4, 2 and 1, whereby total 4-step ALs are configured. In FIG. 14, search space candidates are arranged in CORESETs, thereby configuring hierarchical structures, respectively. As shown in FIG. 14 (*a*), at least one of control channel candidates of all ALs (AL=8, AL=4, AL=2, and AL=1) is included in CORESET 1, and at least one of control channel candidates of all ALs may be included in CORESET 2 as well. As shown in FIG. 14 (*b*), at least one control channel candidate of AL=8 that is a highest AL is arranged in each of CORESET 1 and CORESET 2 and control channel candidates of AL=4 that is a lower AL may be arranged in CORESET 1 only.

7.3. The Unbalanced Hierarchical Structures Across the CORESET-2

Like the embodiment 7.2., a search space may be arranged in a manner of being distributed to a plurality of CORESETs and types of hierarchical structures for the respective CORESETs may be different from each other. There may be no restriction that at least one control channel candidate of a highest AL is arranged in every CORESET.

In a hierarchical structure of one CORESET, control channel candidates of at least two ALs may be included. The two ALs should not be in the direct higher/lower relation (e.g., AL=8 & AL=4, AL=4 & AL=2, AL=2 & AL=1). The numbers of control channel candidates included in the respective CORESETs may be equal to or different from each other.

An example is described with reference to FIG. 15. FIG. 15 shows a case that a length of a highest AL is 8 CCEs. Lower ALs include 4, 2 and 1, whereby total 4-step ALs are configured. As shown in FIG. 15, a search space may be arranged in a manner of being distributed to 3 CORESETs. Referring to FIG. 15, a hierarchical structure configured in CORESET 2 includes control channel candidates of AL=4, AL=2, and AL=1 only. A hierarchical structure configured in CORESET 3 includes control channel candidates of AL=8, AL=2, and AL=1 only. The numbers of the control channel candidates included in CORESET 1, CORESET 2 and CORESET 3 are configured different from each other.

Although a method of arranging a search space in a manner of distributing it to a plurality of CORESETs is described in the embodiment 7, the method of embodiment 7 is usable for a case that a single CORESET exists only.

8. CORESET Sharing Between Search Spaces 8.1. The Hashing Point of the Hierarchical Structure Consisting of CSS and USS There may be two or more types of search spaces that configure hierarchical structures. For example, one search space may be USS and the other may be CSS. In order for a UE to reuse a channel estimation result to the maximum, a reference control channel candidate for determining a hashing point of a hierarchical structure may be selected as one in the CSS. Since the CSS is a section on which a UE should always perform blind decoding, the UE performs channel estimation on a control channel candidate of the CSS at least once. The UE may reuse a channel estimation result (e.g., channel estimation information) of the control channel candidate of the CSS for a USS.

An example is described with reference to FIG. 16. FIG. 16 shows a case that a length of a highest AL is 8 CCEs. Lower ALs include 4, 2 and 1, whereby total 4-step ALs are configured. In FIG. 16, a hashing point of a hierarchical structure may be determined based on a control channel candidate of AL=8 as a reference control channel candidate. If a hashing point of a hierarchical structure is determined based on a control channel candidate of AL=8 in CSS, control channel candidates of lower ALs are arranged with reference to the corresponding hashing point. A UE performs channel estimation and blind decoding on the control channel candidate of AL=8 in the CSS, and may reuse a channel estimation result for the control channel candidate of AL=8 in the CSS without separate channel estimation when performing blind decoding of a control channel candidate corresponding to USS.

9. Composition and Method of the Invention 6—Hierarchical Structures According to the Symbol Number

9.1. Hierarchical Structure in 1 Symbol

As an example of duration of CORESET in the former description, 1 symbol, 2 symbols and 3 symbols are used. If CORESET allocated to a UE is 1-symbol CORESET, a hierarchical structure of a search space should be allocated within the 1-symbol CORESET. The hierarchical structure may be configured with reference to a highest AL existing in CORESET. A portion of a search space providable to a UE may not be arranged in the 1-symbol CORESET. In addition, due to the shortage of resource, a control channel candidate of a highest AL may not be arranged within the 1-symbol CORESET. In case that a portion of a search space is arranged in the 1-symbol CORESET only, a hashing point (i.e., a starting point) of a hierarchical structure may be configured by taking a control channel candidate of a highest AL in the arranged search space as a reference control channel candidate. Control channel candidates within the arranged search space may configure a hierarchical structure based on the configured hashing point.

An example is described with reference to FIG. 17. FIG. 17 shows a case that a length of a highest AL is 8 CCEs. Lower ALs include 4 CCEs, 2 CCEs and 1 CCE, whereby total 4-step ALs are configured. In FIG. 17 (a) to FIG. 17 (c), available resources represent resources within 1 symbol. In the case of FIG. 17 (a), since there are sufficient available resources in 1 symbol, 2 control channel candidates of AL=8 are arranged. As a highest AL is AL=8, a hashing point of a hierarchical structure may be determined by taking a control channel candidate of AL=8 as a reference control channel candidate. The case of FIG. 17 (b) indicates a case that available resources in 1 symbol may include 1 control channel candidate of AL=8 only. As a highest AL is AL=8, a hashing point of a hierarchical structure may be determined by taking a control channel candidate of AL=8 as a reference control channel candidate. FIG. 17 (c) shows a case that 1 control channel candidate of AL=4 is included only because available resources in 1 symbol are insufficient to include a control channel candidate of AL=8. As a highest AL is AL=4, a hashing point of a hierarchical structure may be determined by taking a control channel candidate of AL=4 as a reference control channel candidate.

9.2. Hierarchical Structure in More than 1 Symbol

CORESET consisting of 1 or more symbols may be allocated to a UE. A hierarchical structure may be configured with reference to a highest AL existing in CORESET.

If CORESET is 2-symbol CORESET, control channel candidates may be arranged in a search space in a manner that the same number of the control channel candidates are distributed to each symbol. By taking a control channel candidate of a highest AL among control channel candidates distributed to each symbol as a reference control channel candidate, a hashing point (e.g., a starting point) of a hierarchical structure may be configured. The control channel candidates arranged in the search space may configure a hierarchical structure based on the configured hashing point.

Control channel candidates may be arranged in a search space in a manner that a different number of control channel candidates are distributed to each symbol. In addition, although CORESET is configured with a plurality of symbols, since a resource of the CORESET is insufficient, a portion of a search space may not be arranged. It means that a control channel candidate of a highest AL may be different per symbol. If a control channel candidate of a highest AL is different per symbol, a hashing point (a starting point) of a hierarchical structure may be configured by taking a control channel candidate of a highest AL among control channel candidates arranged in the corresponding symbol as a reference control channel candidate. So to speak, hierarchical structures may be configured for symbols, respectively.

A single search space may be configured by considering resources of a plurality of symbols all. For example, 1 control channel candidate of AL=8 may be arranged across 4 CCEs of a first symbol in CORESET and 4 CCEs of a second symbol therein. From the perspective of the first symbol, 4 CCEs arranged in the first symbol may be regarded as a control channel candidate of AL=4 and a hashing point (a starting point) of a hierarchical structure may be configured by taking the control channel candidate of the corresponding AL=4 as a reference control channel candidate. Based on the configured hashing point, a hierarchical structure may be configured. From the perspective of the second symbol, a hierarchical structure may be configured by taking 4 CCEs arranged in the second symbol as a control channel candidate of AL=4.

An example is described with reference to FIG. 18. FIG. 18 shows a case that a length of a highest AL is 8 CCEs. Lower ALs include 4 CCEs, 2 CCEs and 1 CCE, whereby total 4-step ALs are configured. FIG. 18 shows an example that CORESET is configured with 2 symbols.

As shown in FIG. 18a, control channel candidates per AL may be arranged in each symbol in a manner that the same number of control channel candidates are distributed to each symbol. According an example shown in FIG. 18a, 1 control channel candidate of AL=8 is arranged per symbol, 1 control channel candidate of AL=4 is arranged per symbol, 3 control channel candidates of AL=2 are arranged per symbol, and 3 control channel candidate of AL=1 are arranged per symbol. A control channel candidate of a highest AL among control channel candidates arranged in the first symbol is a control channel candidate of AL=8. In the first symbol, as the control channel candidate of AL=8 becomes a reference control channel candidate, a hierarchical structure for the first symbol is configured. A control channel candidate of a highest AL among control channel candidates arranged in the second symbol is a control channel candidate of AL=8. In the second symbol, as a control channel candidate of AL=8 becomes a reference control channel candidate, a hierarchical structure for the second symbol is configured.

FIG. 18b shows a case that control channel candidates are arranged in a manner that a different number of control channel candidates are distributed per symbol. In a first symbol, a control channel candidate of AL=8 is a control channel candidate of a highest AL. In a second symbol, a control channel candidate of AL=4 is a control channel candidate of a highest AL. In the first symbol, as the control channel candidate of AL=8 becomes a reference control channel candidate, a hierarchical structure for the first symbol is configured. In the second symbol, as the control channel candidate of AL=4 becomes a reference control channel candidate, a hierarchical structure for the second symbol is configured.

FIG. 18c shows a case that control channel candidates are arranged in a manner that a different number of control channel candidates are distributed per symbol due to the shortage of available resources per symbol. In a first symbol, a control channel candidate of AL=8 is a control channel candidate of a highest AL. In a second symbol, a control channel candidate of AL=4 is a control channel candidate of a highest AL. In the first symbol, as the control channel candidate of AL=8 becomes a reference control channel candidate, a hierarchical structure for the first symbol is configured. In the second symbol, as the control channel candidate of AL=4 becomes a reference control channel candidate, a hierarchical structure for the second symbol is configured.

FIG. 18d shows a case that a control channel candidate of AL=8 is arranged across 2 symbols. In a first symbol, a portion of AL=4 in a control channel candidate of AL=8 is a control channel candidate of a highest AL. In a second symbol, a portion of AL=4 in a control channel candidate of AL=8 is a control channel candidate of a highest AL. In the first symbol, as a control channel candidate of a part of AL=4 in the control channel candidate of AL=8 becomes a reference control channel candidate, a hierarchical structure for the first symbol is configured. In the second symbol, as a control channel candidate of a part of AL=4 in the control channel candidate of AL=8 becomes a reference control channel candidate, a hierarchical structure for the second symbol is configured.

10. Application of the Hierarchical Structure 10.1. Resource Allocation

When a resource other than a control channel is allocated, a resource candidate for arranging the corresponding resource may be configured in form of a hierarchical structure. For example, upon resource allocation for PDSCH, PDSCH resource candidates may be configured in a hierarchical structure.

A minimum unit of a resource to be allocated may include an REG or a Resource Block Group (RBG). A size of a resource to be allocated may include single or multiple REGs/RBGs. If a region in which a resource can be arranged is referred to as a resource candidate, one or more resource candidates may be defined per resource size. A resource candidate may have a size of 1 REG/RBG. Alternatively, a resource candidate may have a size of multiple REGs/RBGs. Locations of resource candidates may be determined in configuring a hierarchical structure. A resource candidate in larger size may be referred to as a higher resource candidate. A resource candidate in smaller r size may be referred to as a lower resource candidate.

When a hierarchical structure of resource candidates is configured, a location for a resource candidate of a largest size is defined first in a manner similar to that of configuring a hierarchical structure of a search space. The location of the resource candidate of the largest size may be determined based on a resource allocation method according to resource allocation types 0 to 1 in a conventional communication system.

A location of a resource candidate of a second largest size may be determined within a predetermined range from the resource candidate of the largest size. A location of a resource candidate of a third largest size may be determined within a predetermined range from the resource candidate of the second largest size. Locations of resource candidates of different sizes may be determined sequentially according to sizes.

There may exist a plurality of resource candidates of the same size. Locations of a plurality of lower resource candidates may be determined within a predetermined range from a higher resource candidate.

Through this, all resource candidates may share at least one REG/RBG. Therefore, methods suggested for a search space and control channel candidates in another embodiment of the present disclosure may be applicable to resources other than a control channel.

11. Virtual Highest AL 11.1. Hierarchical Search Space Structure Composition When control channel candidates of ALs are arranged, methods different from the related art in configuring a hierarchical structure are suggested in the foregoing description. A control channel candidate of a lower AL may be included within a control channel candidate of a higher AL or arranged across a boundary of the control channel candidate of the highest AL. In the present embodiment, a higher AL is described in detail.

In case that an AL for specific CORESET is configured, a single UE may not use all ALs of the specific CORESET. Although control channel candidates of AL=1, 2, 4 and 8 may be included in CORESET, a UE may be configured to monitor control channel candidates of AL=1, 2 and 3 only. When a hierarchical structure is configured for USS, although a highest AL may be determined with reference to an AL configured in CORESET, a highest AL may be determined in consideration of an AL configured for a UE only.

A highest AL may be determined based on one or more of the followings.

i) A highest AL among ALs on which a control channel candidate to be actually monitored exists (or, a highest AL configured to the CORESET with non-zero candidate)

ii) A highest AL supported by a fixed network (or, a highest AL supported by the network which is fixed, e.g., AL=8).

iii) An AL to be assumed as a highest AL irrespective of CORESET configuration is configured by a network (or, configured by the network to use which AL to assume as the highest AL regardless of the CORESET configuration).

iv) A highest AL among ALs supported in a corresponding carrier by a UE 11.2. Hierarchical Structure Based on Virtual Highest AL Candidate When a hierarchical structure is configured, control channel candidates of a lower AL may be arranged within a control channel candidate of a higher AL or across a boundary part thereof. Control channel candidates of the rest of ALs except a highest AL exist within a control channel candidate of the highest AL or across a boundary part thereof.

A highest AL may be configured with a virtual AL instead of a control channel candidate on which a control channel can be actually transmitted. If a hierarchical structure is configured by arranging lower ALs with reference to a control channel candidate of the virtual AL, actually existing control channel candidates fail to overlap with each other completely, whereby a blocking problem is reduced. Moreover, actually existing control channel candidates fail to be completely separated from each other, thereby increasing the probability of reusing a channel estimation result performed on a control channel candidate of a specific AL for a control channel candidate of another AL.

A BS may transmit configuration of a virtual AL and information, which indicates that the virtual AL is not actually used for control channel transmission, to a UE. The information transmitted to the UE by the BS may be transmitted through a higher layer signal (e.g., RRC signal) or physical layer signaling. Based on the received information, the UE may monitor control channel candidates except a control channel candidate of the virtual AL.

An example is described with reference to FIG. 19. FIG. 19 shows a case that a length of a highest AL is 8 CCEs. Lower ALs include 4 CCEs, 2 CCEs and 1 CCE, whereby total 4-step ALs are configured. As an example of a virtual AL, AL=16 is shown in FIG. 19. There may be 2 control channel candidates of virtual AL=16. A UE may be configured to monitor control channel candidates of AL=1, 2, 4 and 8. The control channel candidates of AL=1, 2, 4 and 8 may configure a hierarchical structure together with a control channel candidate of virtual AL=16. When a hierarchical structure is configured, the method described in another embodiment of the present disclosure may be used. If the method described in the embodiment 6.4 is used, as shown in FIG. 19, control channel candidates of other ALs are arranged contiguously or non-contiguously within a control channel candidate of virtual AL=16. One of 2 control channel candidates of AL=16, which is not shown, is not contiguous with the illustrated control channel candidate and may be used for another hierarchical structure configuration.

11.3. Hierarchical Structure Based on Virtual Highest AL Candidate 2

Apart from control channel candidates of AL that should be monitored by a UE, an AL or control channel candidate for hashing point configuration only may be configured. Information on the AL or control channel candidate for hashing point configuration may be transmitted to the UE from a BS through a physical or higher layer signal.

For example, at least one of 1 control channel candidate of AL=8, 3 control channel candidates of AL=4, a control channel candidate of AL=2 and/or a control channel candidate of AL=1 may be configured for a UE. It is difficult for the 3 control channel candidates of AL=3 to be included in the 1 control channel candidate of AL=8. Considering this, although there is 1 control channel candidate of AL=8 the UE will monitor, a control channel candidate of AL=8 for hashing point configuration may be configured additionally. A BS configures a plurality of control channel candidates of AL=8 and may inform a UE of information on a control channel candidate that will be monitored by the UE and information on a control channel candidate for hashing point configuration. As the information on the control channel candidate that will be monitored by the UE and the control channel candidate for the hashing point configuration are used, a hierarchical structure including 3 control channel candidates of AL=4 may be configured. Through this, the advantage attributed to the hierarchical structure configuration can be utilized without increasing the number of control channel candidates a UE will monitor.

For another example, 1 control channel candidate of AL=4, 3 control channel candidates of AL=2, and one or more control channel candidates of AL=1 may be configured for a UE. Instead of additionally configuring a control channel candidate of AL=4 for hashing point configuration, a control channel candidate of AL=8 for hashing point configuration may be configured additionally. Based on the control channel candidate of AL=8 for the hashing point configuration, a hierarchical structure including 1 control channel candidate of AL=4, 3 control channel candidates of AL=2, and one or more control channel candidates of AL=1 may be configured. A BS may transmit information indicating that the control channel candidate of AL=8 is a control channel candidate for hashing point configuration to the UE. Thus, the UE may utilize the advantage attributed to the hierarchical structure configuration without monitoring the control channel candidate of AL=8.

11.4. Decision Rule for Virtual Candidate

A limit value of channel estimation complexity may be configured for a UE. Once the limit value of channel estimation complexity is configured, the number of CCEs that can be blind-decoded by the UE may be limited. The limit value of channel estimation complexity is configured to determine the limitation of channel estimation that will be performed by the UE. Based on the limit value of channel estimation complexity, a search space is arranged and a hierarchical structure may be configured.

A control channel candidate for configuring a virtual AL or hashing point, which is suggested in the embodiment 11.2 or the embodiment 11.3, is actually used not for control channel transmission but for hashing point configuration only. A UE should be able to identify a control channel candidate Cr capable of transmitting a control channel and control channel candidates (virtual control channel candidate, Ci) used for hashing point configuration only among control channel candidates in a hierarchical structure when monitoring control channel candidates.

A UE may inform a UE of Cr and Ci through a physical signal or a higher layer signal. Alternatively, although there is no separate signaling, a rule for configuring a virtual control channel candidate may be already defined in each of a network and a UE.

Specifically, a BS may inform a UE of Cr and Ci per search space through a higher layer signal.

The rules defined in each of the network and the UE may be as follows.

A virtual control channel candidate of the same AL as a highest AL among ALs configured for a UE may be created. In configuring the number of virtual control channel candidates, the number of CCEs occupied by a virtual control channel candidate and control channel candidates of a highest AL may be smaller than a limit value of channel estimation complexity. The number of CCEs occupied by a virtual control channel candidate and control channel candidates of a highest AL may be set to the maximum number of CCEs available within the limit value of the channel estimation complexity.

Alternatively, a virtual control channel candidate of the same AL as a highest AL among ALs configured for a UE may be created. In configuring the number of virtual control channel candidates, the number of CCEs occupied by a virtual control channel candidate and control channel candidates of a highest AL may be smaller than a limit value of channel estimation complexity. The number of CCEs occupied by a virtual control channel candidate and control channel candidates of a highest AL may be set greater than the number of CCEs occupied by control channel candidates of a specific lower AL.

Alternatively, a virtual control channel candidate may not be the same AL as a highest AL among ALs configured for a UE. The virtual control channel candidate may be a maximum AL among ALs that is an aliquot of 'the number of CCEs set to a limit value of channel estimation complexity'. In configuring the number of virtual control channel candidates, the number of CCEs occupied by a virtual control channel candidate and control channel candidates of a highest AL may be equal to the limit value of the channel estimation complexity.

If the rules for configuring a virtual control channel candidate is already defined in each of a network and a UE, the UE may configure a virtual control channel candidate without signaling of a BS. The network may transmit PDCCH on the assumption that the UE is already aware of the number of virtual control channel candidates.

As described in other embodiments, a hashing point of a hierarchical structure is determined as a hashing point of a reference AL. When a hashing point of a reference AL is determined, the reference AL may include an AL in which a virtual control channel candidate is included according to the present embodiment.

12. Additional Embodiment Combinable with Embodiments 3 to 11

12.1. Hierarchical Structure Based on Multiple Search Space Sets

A plurality of search spaces for DCI of one kind may configure a search space set. A UE may have a plurality of search space sets configured in one CORESET. A plurality of search space sets for a plurality of DCIs may be configured in one CORESET.

Search space sets existing in one CORESET may include at least one of a search space set for fallback DCI, a search space set for non-fallback DCI, a search space set for downlink DCI, a search space set for uplink DCI, a search space set for slot scheduling DCI, and/or a search space set for mini-slot scheduling DCI.

When a plurality of search space sets are configured in a UE, a plurality of hierarchical structures may be configured for each of the search space sets in configuring a hierarchical structure. In configuring a hierarchical structure, a single hierarchical structure for all search space sets may be configured instead of configuring a plurality of hierarchical structures for each of the search space sets.

12.2. Building Rule for Hierarchical Structure

Sizes of resources occupied by control channel candidates for each of ALs are compared with each other. A hierarchical structure may be then configured by taking an AL of control channel candidates occupying the most resources as a reference AL.

For example, AL=1, 2, 4 and 8 may be configured. There may be 6 control channel candidates of AL=1, 6 control channel candidates of AL=2, 4 control channel candidates of AL=4, and 1 control channel candidate of AL=8. The number of CCEs occupied by the control channel candidates of AL=1 is 6, the number of CCEs occupied by the control channel candidates of AL=2 is 12, the number of CCEs occupied by the control channel candidates of AL=4 is 16, and the number of CCEs occupied by the control channel candidates of AL=8 is 8. Since a size of a resource occupied by the control channel candidates of AL=4 is the largest, a hierarchical structure may be configured by taking AL=4 as a reference AL.

One or more hashing points may be determined based on a hashing point with reference to AL=4. Based on the determined hashing point, control channel candidates of AL=1, control channel candidates of AL=2, and a control channel candidate of AL=8 may be arranged. The arranged control channel candidates of AL=1, the arranged control channel candidates of AL=2 and the arranged control channel candidate of AL=8 may configure a hierarchical structure.

12.3. Shadow Definition with Limit of Channel Estimation Complexity

As described above, a limit value of channel estimation complexity may be configured in a UE. If the limit value of the channel estimation complexity is configured, the number of CCEs blind-decodable by the UE may be limited. The limit value of the channel estimation complexity is configured to determine a limit of channel estimation that will be performed by the UE. Based on the limit value of the channel estimation complexity, a search space is arranged and a hierarchical structure may be configured.

A whole resource region in which a search space can be arranged within 1 symbol is referred to as a shadow. As shown in FIG. 19, in shadow configuration, a part, in which control channel candidates for the respective ALs are arranged in a manner of overlapping with one another, is considered. As a unit of a shadow, CCE may be usable. Hereinafter, a method of configuring a shadow is described.

A size of a shadow may be equal to a limit value of channel estimation complexity. If a size of a shadow is equal to a limit value of channel estimation complexity, a search space may be arranged using the maximum number of CCEs within the limit value of the channel estimation complexity. A shadow may include a discontinuous section in a frequency domain.

A plurality of CORESETs may be configured for a UE. A shadow may be configured in a manner of being distributed to a plurality of CORESETs. For example, when a size of a shadow is 24 CCEs and 2 CORESTs are configured for a UE, 18 CCEs, which correspond to a portion of the shadow, may be configured in one CORESET and 6 CCEs, which correspond to the rest of the shadow, may be configured in the other CORESET. In one CORESET, a separated partial shadow may include a discontinuous section in a frequency region.

One of shadow configuring methods is a method of configuring a shadow in the same size of a limit value of channel estimation complexity. In addition, a method of arriving at a limit value of channel estimation complexity by gradually increasing a shadow may be available. Hereinafter, a limit value of channel estimation complexity may be denoted by P.

Firstly, a resource region occupied by a network or a predefined configuration is displayed. The displayed resource region may include a resource region for preferentially arranging a specific control channel candidate of a specific search space set.

Secondly, for all search spaces within all CORESETs configured for a UE, a priority is determined. The priority may be determined by considering at least one of whether a search space set is USS or CSS, importance of a DCI format included in a search space set, a priority of an RNTI of performing CRC scrambling on a DCI format included in a search space set, and/or a priority of a search space included CORESET.

After the priority per search space set has been determined, a control channel candidate of a highest AL in a search space set of a highest priority starts to be arranged based on a hashing function. For example, after one of control channel candidates of a highest AL within a first-priority search space set has been arranged, a control channel candidate of a highest AL within a second-priority search space set is arranged and a control channel candidate of a highest AL within a third-priority search space set is then arranged. So to speak, based on priorities of search space sets, control channel candidates of highest ALs within search space sets are arranged, respectively.

While the control channel candidates are sequentially arranged based on the priorities of the search space sets, a size of a shadow may become greater than P.

If the size of the shadow becomes greater than P, a last arranged control channel candidate is deleted and the arrangement of the control channel candidate of the highest AL may be completed. For example, an AL of a control channel candidate of a highest AL of a last arranged search space set is 8 and P may be 30. If a size of a shadow becomes 32 CCEs due to the control channel candidate of the highest AL of the last arranged search space set, the control channel candidate of the highest AL of the last arranged search space set is deleted and the size of the shadow becomes 24 CCEs.

Alternatively, if the size of the shadow becomes greater than P, a different control channel candidate within the search space set including the deleted control channel candidate may be arranged in consideration of a difference value between the shadow size due to the deleted control channel candidate and the P. As the different control channel candidate, a control channel candidate capable of maximally reducing the difference between the shadow size and the P value may be selected. For example, the difference between the shadow size and the P value may be 6 CCEs. When it is AL=8 of the deleted control channel candidate, if a control channel candidate of AL=4 is included in the search space set including the deleted control channel candidate, the control channel candidate of AL=4 may be arranged instead of the deleted control channel candidate of AL=8.

There may be no control channel candidate capable of maximally reducing the difference between the shadow size and the P value in the search space set including the deleted control channel candidate. A control channel candidate may not be arranged in the search space set including the deleted control channel candidate, and a control channel candidate capable of maximally reducing the difference between the shadow size and the P value within a search space set of a next priority may be arranged. For example, a difference between the shadow size and the P value may be 6 CCEs. If there is no control channel candidate of AL=4 in the search space set including the deleted control channel candidate, a control channel candidate of AL=4 within a search space set of a next priority is arranged. If there is no control channel candidate of AL=4 within the search space set of the next priority, a control channel candidate of AL=4 within a search space set of a second-next priority may be arranged.

Subsequently, hierarchical structures are configured for search space sets, respectively. The hierarchical structure per search space set is configured based on arranged control channel candidates of a highest AL. Regarding CCEs occupied by the arranged control channel candidates of the highest AL, other control channel candidates within the corresponding search space set are arranged based on a predefined hashing function. For example, in a shadow, there may exist 2 control channel candidates of AL=8 of a first-priority search space set, 1 control channel candidate of AL=8 of a second-priority search space set, 1 control channel candidate of AL=4 of the second-priority search space set, and 1 control channel candidate of AL=8 of a third-priority search space set. Within 16 CCEs occupied by the 2 control channel candidates of the first-priority search space set, the rest of the control channel candidates of the first-priority search space sets may be arranged based on a hashing function. Within 12 CCEs occupied by the 2 control channel candidates of the second-priority search space set, the rest of the control channel candidates of the second-priority search space sets may be arranged based on a hashing function. Within 8 CCEs occupied by the 1 control channel candidate of the second-priority search space set, the rest of the control channel candidates of the third-priority search space sets may be arranged based on a hashing function.

FIG. 21 is a conceptual diagram of a signal receiving method according to embodiments of the present disclosure.

Referring to FIG. 21, embodiments of the present disclosure may be performed by a UE and include a step S2101 of configuring a search space set configured in a hierarchical structure and a step S2003 of monitoring control channel candidates within the configured search space set. Particularly, when the hierarchical structure is configured, a control channel candidate of a lower AL within the search space set is randomly arranged with reference to a control channel candidate of a highest AL within the search space set and may be arranged in a manner that a partial or whole region of the control channel candidate of the lower AL overlaps with the control channel candidate of the highest AL.

In addition to the operation of FIG. 21, one or more of the operations described through the embodiments 4 to 12 may be combined and implemented additionally.

For example, a hashing point of a control channel candidate of each lower AL is a sum of a point parameter having a value suggested in one of the embodiments 4.1 to 4.3 and a hashing point of a control channel candidate of a highest AL, and may be determined independently.

The control channel candidate of the highest AL may include a virtual control channel candidate, which is not configured as a control channel candidate for control information transmission, within a control resource set including the search space set.

Alternatively, a plurality of search space sets for DCI containing different information may be included in a single hierarchical structure. When a single hierarchical structure including a plurality of search space sets is configured, control channel candidates may be sequentially arranged by starting with a control channel candidate of a highest AL within a search space set of a higher priority with reference to a channel estimation complexity limit value configured for a UE.

13. Device Configuration

FIG. 22 is a block diagram illustrating an example of communication performed between a wireless device 10 and a network node 20. In this case, the network node 20 can be replaced with a wireless device or a UE shown in FIG. 28.

In the present specification, a wireless device 10 or a network node 20 includes a transceiver 11/21 configured to communicate with one or more other wireless devices, a network node, and/or a different element of a network. The transceiver 11/21 can include one or more transmitter, one or more receivers, and/or one or more communication interfaces.

The transceiver 11/21 can include one or more antennas. The antenna performs a function of transmitting a signal processed by the transceiver 11/21 to the external or a function of receiving a radio signal from the external and forwarding the signal to a processing chip 12/22 according to one embodiment of the present disclosure. The antenna can be referred to as an antenna port as well. Each antenna may correspond to a physical antenna or can be configured by a combination of two or more physical antenna elements. A signal transmitted from each antenna is not further decomposed by the wireless device 10 or the network node 20. A reference signal (RS), which is transmitted in response to an antenna, defines the antenna in the aspect of the wireless device 10 or the network node 20. The RS enables the wireless device 10 or the network node 20 to estimate a channel for the antenna irrespective of whether a channel corresponds to a single wireless channel from a physical antenna or a composite channel from a plurality of physical antenna elements including the antenna. In particular, an antenna is defined to induce a channel on which a symbol on an antenna is forwarded from a channel on which a different symbol on the same antenna is forwarded. In case of a transceiver supporting a MIMO (Multi-Input Multi-Output) function that transmits and receives data using a plurality of antennas, the transceiver can be connected with two or more antennas.

According to the present disclosure, the transceiver 11/21 can support receive beamforming and transmit beamforming. For example, the transceiver 11/21 according to the present disclosure can be configured to perform functions illustrated in FIGS. 5 to 8.

And, the wireless device 10 or the network node 20 includes a processing chip 12/22. The processing chip 12/22 can include at least one processor such as a processor 13/23 and at least one memory device such as a memory 14/24.

The processing chip 12/22 can control at least one of methods and/or processes described in the present specification. In other word, the processing chip 12/22 can be configured to perform at least one or more embodiments described in the present specification.

The processor 13/23 includes at least one processor for performing a function of the wireless device 10 or the network node 20 described in the present specification.

For example, the at least one processor can transmit and receive information by controlling the transceiver 11/21 illustrated in FIG. 22.

The processor 13/23 included in the processing chip 12/22 performs coding and modulation on a signal and/or data to be transmitted to the external of the wireless device 10 or the network node 20 and transmits the signal and/or the data to the transceiver 11/21. For example, the processor 12/23 converts a data string to be transmitted into the K number of layers by performing de-multiplexing, channel coding, scrambling, modulation, etc. on the data string. The coded data string is also referred to as a codeword. The codeword is equivalent to a transport block corresponding to a data block provided by MAC layer. A transport block (TB) is coded by a codeword and a codeword is transmitted to a reception device in a form of one or more layers. In order to perform frequency up converting, the transceiver 11/21 can include an oscillator. The transceiver 11/21 can include the Nt (Nt is a positive integer equal to or greater than 1) number of Tx antennas.

The processing chip 12/22 includes a memory 14/24 configured to store data, a programmable software, and/or other information for performing the embodiments described in the present specification.

In other word, according to the embodiments of the present specification, when the memory 14/24 is executed by at least one processor such as the processor 13/23, the memory enables the processor 13/23 to perform all or a part of the processes controlled by the processor 13/23 mentioned earlier in FIG. 22. Or, the memory stores a software code 15/25 including commands for performing the embodiments described in the present specification with reference to FIGS. 1 to 21.

Specifically, the wireless device 10 of FIG. 22 may be configured to perform the UE operations proposed in the present disclosure, and the network node 20 of FIG. 11 may be configured to perform the network/BS operations proposed in the present disclosure.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

What is claimed is:

1. A method of receiving a signal by a user equipment in a wireless communication system, the method comprising:
    configuring a search space set configured in a hierarchical structure; and
    monitoring control channel candidates within the configured search space set,
    wherein when the hierarchical structure is configured, a control channel candidate of a lower Aggregation Level (AL) within the search space set is randomly arranged with reference to a control channel candidate of a highest AL within the search space set in a manner that a partial or whole region of the control channel candidate of the lower AL overlaps with the control channel candidate of the highest AL,
    wherein the control channel candidate of the highest AL is a virtual control channel candidate not configured as a control channel candidate for control information transmission within a Control Resource Set (CORE-SET) including the search space set,
    wherein a channel estimation complexity limit value for limiting a number of CCEs blind-decodable by the user equipment is configured, and
    wherein the virtual control channel candidate is configured as a control channel candidate corresponding to a maximum AL among ALs that is an aliquot of the number of CCEs set to the channel estimation complexity limit value.

2. The method of claim 1, wherein a hashing point of the control channel candidate of the lower AL is configured based on a reference hashing point and a point parameter, wherein the reference hashing point is a hashing point of the control channel candidate of the highest AL, and wherein the point parameter is a value to give a difference between the reference hashing point and the hashing point of the control channel candidate of the lower AL.

3. The method of claim 2, wherein when a value of the pointer parameter is denoted by γ, the hashing point of the control channel candidate of the lower AL is determined as a sum of the reference hashing point and the γ, wherein the γ satisfies $-L_l \leq \gamma < L_h$, wherein the $L_l$ is the number of Control Channel Elements (CCEs) for arranging the control channel candidate of the lower AL thereon, and wherein the $L_h$ is the number of CCEs for arranging the control channel candidate of the highest AL thereon.

4. The method of claim 1, wherein the user equipment reuses a channel estimation result performed for blind decoding of the control channel candidate of the highest AL for a partial or whole region of the control channel candidate of the lower AL overlapping with the control channel candidate of the highest AL.

5. The method of claim 1, further comprising:
configuring a plurality of search space sets for different DCIs; and
monitoring a plurality of control channel candidates for each of a plurality of the search space sets for the different DCIs,
wherein all control channel candidates within the search space sets are included in a hierarchical structure.

6. The method of claim 5, wherein a priority is configured for each of a plurality of the search space sets, and wherein when the hierarchical structure is configured, the control channel candidates are sequentially arranged by starting with a control channel candidate of a highest AL within a search space set of a high priority within a range not exceeding the limit value.

7. The method of claim 1, wherein the user equipment is capable of communicating with at least one of another user equipment, a user equipment related to an autonomous driving vehicle, a base station and/or a network.

8. A user equipment receiving a signal in a wireless communication system, the user equipment comprising:
a transceiver; and
a processor controlling the transceiver,
wherein the processor is configured to configure a search space set configured in a hierarchical structure and control the transceiver to monitor control channel candidates within the configured search space set,
wherein when the hierarchical structure is configured, a control channel candidate of a lower Aggregation Level (AL) within the search space set is randomly arranged with reference to a control channel candidate of a highest AL within the search space set in a manner that a partial or whole region of the control channel candidate of the lower AL overlaps with the control channel candidate of the highest AL,
wherein the control channel candidate of the highest AL is a virtual control channel candidate not configured as a control channel candidate for control information transmission within a Control Resource Set (CORESET) including the search space set,
wherein a channel estimation complexity limit value for limiting the number of CCEs blind-decodable by the user equipment is configured, and
wherein the virtual control channel candidate is configured as a control channel candidate corresponding to a maximum AL among ALs that is an aliquot of the number of CCEs set to the channel estimation complexity limit value.

9. The user equipment of claim 8, wherein a hashing point of the control channel candidate of the lower AL is configured based on a reference hashing point and a point parameter, wherein the reference hashing point is a hashing point of the control channel candidate of the highest AL, and wherein the point parameter is a value to give a difference between the reference hashing point and the hashing point of the control channel candidate of the lower AL.

10. The user equipment of claim 9, wherein when a value of the pointer parameter is denoted by γ, the hashing point of the control channel candidate of the lower AL is determined as a sum of the reference hashing point and the γ, wherein the γ satisfies $-L_l \leq \gamma < L_h$, wherein the $L_l$ is the number of Control Channel Elements (CCEs) for arranging the control channel candidate of the lower AL thereon, and wherein the $L_h$ is the number of CCEs for arranging the control channel candidate of the highest AL thereon.

11. The user equipment of claim 8, wherein the processor reuses a channel estimation result performed for blind decoding of the control channel candidate of the highest AL for a partial or whole region of the control channel candidate of the lower AL overlapping with the control channel candidate of the highest AL.

12. The user equipment of claim 8, wherein the processor is further configured to configure a plurality of search space sets for different DCIs and monitor a plurality of control channel candidates for each of a plurality of the search space sets for the different DCIs and wherein all control channel candidates within the search space sets are included in a hierarchical structure.

13. The user equipment of claim 8, wherein the user equipment is capable of communicating with at least one of another user equipment, a user equipment related to an autonomous driving vehicle, a base station and/or a network.

* * * * *